US011172101B1

(12) United States Patent
Boozer et al.

(10) Patent No.: US 11,172,101 B1
(45) Date of Patent: Nov. 9, 2021

(54) MULTIFUNCTION ACCESSORY CASE

(71) Applicant: Apple Inc., Cupertino, CA (US)

(72) Inventors: Brad G. Boozer, Saratoga, CA (US);
Ryan C. Perkins, San Francisco, CA (US); Colin M. Ely, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/577,404

(22) Filed: Sep. 20, 2019

Related U.S. Application Data

(60) Provisional application No. 62/733,905, filed on Sep. 20, 2018.

(51) Int. Cl.
*H04N 5/225* (2006.01)
*H04N 7/18* (2006.01)
*H04R 1/10* (2006.01)
*H04N 5/232* (2006.01)

(52) U.S. Cl.
CPC ......... *H04N 5/2252* (2013.01); *H04N 5/2254* (2013.01); *H04N 5/22525* (2018.08); *H04N 5/23203* (2013.01); *H04N 7/185* (2013.01); *H04R 1/1016* (2013.01); *H04R 1/1025* (2013.01); *H04R 1/1041* (2013.01); *H04R 1/1091* (2013.01); *H04R 2420/07* (2013.01)

(58) Field of Classification Search
None
See application file for complete search history.

(56) References Cited

U.S. PATENT DOCUMENTS

| 3,297,933 | A | 1/1967 | McCarthy |
| 3,892,638 | A | 7/1975 | Stevens et al. |
| 4,379,988 | A | 4/1983 | Mattatall |
| 4,521,919 | A | 6/1985 | Molloy |
| 5,135,012 | A | 8/1992 | Kamen et al. |

(Continued)

FOREIGN PATENT DOCUMENTS

| CN | 1706171 | 12/2005 |
| CN | 101641969 | 2/2010 |

(Continued)

OTHER PUBLICATIONS

US 9,794,673 B2, 10/2017, Chawan et al. (withdrawn)

(Continued)

*Primary Examiner* — Cynthia Segura
(74) *Attorney, Agent, or Firm* — Kilpatrick, Townsend and Stockton LLP

(57) ABSTRACT

Embodiments of the disclosure pertain to multifunctional accessory cases for electronic devices (e.g., a pair of wireless earbuds). Embodiments pertain to a case for a portable listening device, such as a pair of headphones or a pair of wireless earbuds. The case can include one or more cavities to hold the listening device and charging circuitry to provide power to a rechargeable battery within the listening device (or within each of the pair of earbuds). The embodiments of the case can include a digital camera. The digital camera can include a lens mounted on the housing, digital processing circuitry, and a memory. In some embodiments the digital camera can be powered by a case battery. Embodiments of the case can include a strobe, a microphone, a speaker, a radio frequency transmitter/receiver, and a display.

22 Claims, 13 Drawing Sheets

(56) References Cited

U.S. PATENT DOCUMENTS

| | | | |
|---|---|---|---|
| 5,253,300 | A | 10/1993 | Knapp |
| 5,610,494 | A | 3/1997 | Grosfilley |
| 6,190,203 | B1 | 2/2001 | Murakami et al. |
| 6,193,833 | B1 | 2/2001 | Gizowski et al. |
| 6,285,757 | B1* | 9/2001 | Carroll ............... H04B 1/385 |
| | | | 345/619 |
| 6,310,960 | B1 | 10/2001 | Saaski et al. |
| 6,465,757 | B1 | 10/2002 | Chen |
| 6,519,448 | B1 | 2/2003 | Dress et al. |
| 6,658,124 | B1 | 12/2003 | Meadows |
| 6,751,327 | B1 | 6/2004 | Urso et al. |
| 7,062,057 | B2 | 6/2006 | Wu |
| D529,288 | S | 10/2006 | Ham |
| 7,775,675 | B2 | 8/2010 | Hamm |
| 7,922,535 | B1 | 4/2011 | Jiang et al. |
| 8,009,001 | B1 | 8/2011 | Cleveland |
| 8,009,002 | B2 | 8/2011 | Fiedler |
| 8,027,497 | B2 | 9/2011 | Klemenz et al. |
| 8,078,787 | B2 | 12/2011 | Lydon et al. |
| 8,126,177 | B2 | 2/2012 | Jensen |
| 8,170,623 | B2 | 5/2012 | Dorogusker et al. |
| 8,180,093 | B2 | 5/2012 | Hankey et al. |
| 8,181,233 | B2 | 5/2012 | Wyld |
| 8,185,084 | B2 | 5/2012 | Terlizzi |
| 8,311,255 | B2 | 11/2012 | Hankey et al. |
| 8,401,219 | B2 | 3/2013 | Hankey et al. |
| 8,437,813 | B2 | 5/2013 | Griffin et al. |
| 8,485,404 | B2 | 7/2013 | Monaco et al. |
| 8,538,050 | B2 | 9/2013 | Fink et al. |
| 8,650,925 | B2 | 2/2014 | Hankey et al. |
| 8,701,912 | B2 | 4/2014 | Carnevali et al. |
| 8,712,071 | B2 | 4/2014 | Terlizzi et al. |
| 8,867,758 | B2 | 10/2014 | Terlizzi et al. |
| 8,873,790 | B2 | 10/2014 | Hayashida et al. |
| 8,891,800 | B1 | 11/2014 | Shaffer |
| 8,965,030 | B2 | 2/2015 | Aase |
| 9,014,405 | B2 | 4/2015 | Larsen et al. |
| 9,118,990 | B2 | 8/2015 | Hankey et al. |
| 9,148,717 | B2 | 9/2015 | Shaffer |
| 9,210,498 | B1 | 12/2015 | Shaffer |
| 9,258,663 | B2 | 2/2016 | Aase et al. |
| 9,287,657 | B2 | 3/2016 | Hankey et al. |
| 9,294,830 | B2 | 3/2016 | Terlizzi |
| 9,319,815 | B2 | 4/2016 | Warren et al. |
| 9,402,120 | B2 | 7/2016 | Lindén et al. |
| 9,509,358 | B1 | 11/2016 | Shaffer et al. |
| 9,559,548 | B2 | 1/2017 | Kwon et al. |
| 9,608,359 | B2 | 3/2017 | Arai et al. |
| 9,769,558 | B2* | 9/2017 | Chandramohan .... H04R 1/1041 |
| 9,961,431 | B2 | 5/2018 | McPeak et al. |
| 9,961,433 | B2 | 5/2018 | Chawan et al. |
| 9,967,644 | B2 | 5/2018 | Chawan et al. |
| 9,967,648 | B2 | 5/2018 | Panecki et al. |
| 9,967,649 | B2 | 5/2018 | Chandramohan et al. |
| 9,967,650 | B2 | 5/2018 | Chawan et al. |
| 9,973,840 | B2 | 5/2018 | Wagman et al. |
| 9,973,845 | B2 | 5/2018 | Chawan et al. |
| 10,003,880 | B2 | 6/2018 | Wagman et al. |
| 10,003,881 | B2 | 6/2018 | Cousins et al. |
| 10,009,678 | B2 | 6/2018 | Panecki et al. |
| 10,097,913 | B2 | 10/2018 | Zörkendörfer et al. |
| 10,182,282 | B2 | 1/2019 | McPeak et al. |
| 10,206,474 | B2 | 2/2019 | Brzezinski et al. |
| 10,212,506 | B2 | 2/2019 | Panecki et al. |
| 10,225,637 | B2 | 3/2019 | Panecki et al. |
| 10,390,594 | B2 | 8/2019 | Brzezinski et al. |
| 10,397,682 | B2 | 8/2019 | Chawan et al. |
| 10,397,683 | B2 | 8/2019 | LeBlanc et al. |
| 10,966,047 | B1* | 3/2021 | Tong ................... H04R 29/006 |
| 2002/0089307 | A1 | 7/2002 | Yang |
| 2002/0131609 | A1 | 9/2002 | Kobayashi et al. |
| 2002/0147026 | A1 | 10/2002 | Hsieh |
| 2003/0165250 | A1 | 9/2003 | Garber et al. |
| 2004/0112519 | A1 | 6/2004 | Mori |
| 2005/0175491 | A1 | 8/2005 | Ponziani et al. |
| 2005/0212479 | A1 | 9/2005 | Tsunoda et al. |
| 2005/0227635 | A1 | 10/2005 | Hawkins et al. |
| 2007/0032274 | A1 | 2/2007 | Lee et al. |
| 2007/0053678 | A1* | 3/2007 | Yamane ................ G03B 17/18 |
| | | | 396/286 |
| 2007/0067954 | A1 | 3/2007 | Finney et al. |
| 2007/0104343 | A1 | 5/2007 | Bengtsson et al. |
| 2007/0194633 | A1 | 8/2007 | Ueda et al. |
| 2007/0195978 | A1 | 8/2007 | Fink et al. |
| 2007/0254696 | A1 | 11/2007 | Kajitani |
| 2007/0256946 | A1 | 11/2007 | Godshaw et al. |
| 2007/0263893 | A1 | 11/2007 | Kim |
| 2008/0090622 | A1 | 4/2008 | Kim et al. |
| 2008/0090626 | A1 | 4/2008 | Griffin et al. |
| 2008/0136369 | A1 | 6/2008 | Klemenz et al. |
| 2008/0164934 | A1 | 7/2008 | Hankey et al. |
| 2008/0166006 | A1 | 7/2008 | Hankey et al. |
| 2008/0166968 | A1 | 7/2008 | Tang et al. |
| 2008/0180874 | A1 | 7/2008 | Gauger et al. |
| 2008/0186683 | A1 | 8/2008 | Ligtenberg et al. |
| 2008/0240480 | A1 | 10/2008 | Pinnell et al. |
| 2008/0240486 | A1 | 10/2008 | Garcia et al. |
| 2008/0278269 | A1 | 11/2008 | Ramirez et al. |
| 2008/0292123 | A1 | 11/2008 | Jensen |
| 2008/0320190 | A1 | 12/2008 | Lydon et al. |
| 2009/0067652 | A1 | 3/2009 | Schmidt et al. |
| 2009/0071502 | A1 | 3/2009 | Drugeon |
| 2009/0108801 | A1 | 4/2009 | Kozisek |
| 2009/0141918 | A1 | 6/2009 | Chris et al. |
| 2009/0176391 | A1 | 7/2009 | Brock et al. |
| 2009/0184190 | A1* | 7/2009 | Lin ...................... H04R 1/1033 |
| | | | 242/405 |
| 2009/0233652 | A1 | 9/2009 | Yang |
| 2009/0296968 | A1 | 12/2009 | Wu et al. |
| 2009/0326689 | A1 | 12/2009 | Allard |
| 2010/0056272 | A1 | 3/2010 | Dutilly |
| 2010/0116703 | A1 | 5/2010 | Elenes |
| 2010/0171578 | A1 | 7/2010 | Fiedler |
| 2010/0210326 | A1 | 8/2010 | Ladouceur et al. |
| 2010/0320961 | A1* | 12/2010 | Castillo ................ H02J 7/0044 |
| | | | 320/107 |
| 2011/0159934 | A1 | 6/2011 | Yu et al. |
| 2011/0182458 | A1 | 7/2011 | Rosener et al. |
| 2011/0188689 | A1 | 8/2011 | Beck et al. |
| 2011/0218502 | A1 | 9/2011 | Ilo et al. |
| 2011/0233078 | A1* | 9/2011 | Monaco ................ A45C 11/00 |
| | | | 206/223 |
| 2011/0284783 | A1 | 11/2011 | Haynes et al. |
| 2011/0286615 | A1 | 11/2011 | Olodort et al. |
| 2012/0074006 | A1 | 3/2012 | Monaco et al. |
| 2012/0077377 | A1 | 3/2012 | Han |
| 2012/0114902 | A1 | 5/2012 | Furuyama et al. |
| 2012/0140963 | A1 | 6/2012 | Larsen et al. |
| 2012/0237074 | A1 | 9/2012 | Aase |
| 2012/0243691 | A1 | 9/2012 | Lin |
| 2012/0289090 | A1 | 11/2012 | Oiri et al. |
| 2013/0063873 | A1 | 3/2013 | Wodrich et al. |
| 2013/0148839 | A1* | 6/2013 | Stevinson ............ H04R 1/1033 |
| | | | 381/384 |
| 2013/0149990 | A1 | 6/2013 | Otto et al. |
| 2013/0165046 | A1 | 6/2013 | Tang et al. |
| 2013/0183844 | A1 | 7/2013 | Wang |
| 2013/0206612 | A1 | 8/2013 | Chun |
| 2013/0222323 | A1 | 8/2013 | Mckenzie |
| 2013/0233762 | A1 | 9/2013 | Balaji et al. |
| 2013/0238829 | A1 | 9/2013 | Laycock et al. |
| 2013/0252552 | A1 | 9/2013 | Vitkus et al. |
| 2013/0260615 | A1 | 10/2013 | Jol et al. |
| 2013/0265702 | A1 | 10/2013 | Merenda |
| 2013/0315431 | A1 | 11/2013 | Grinker et al. |
| 2013/0329359 | A1 | 12/2013 | Andre et al. |
| 2013/0343593 | A1 | 12/2013 | Howes et al. |
| 2013/0343595 | A1 | 12/2013 | Zorkendorfer et al. |
| 2014/0034080 | A1 | 2/2014 | Paquet et al. |
| 2014/0068944 | A1 | 3/2014 | Aase et al. |
| 2014/0073190 | A1 | 3/2014 | Zhao et al. |
| 2014/0079237 | A1* | 3/2014 | Cataldo ................ H04R 1/1033 |
| | | | 381/74 |
| 2014/0120983 | A1 | 5/2014 | Lam |

(56) References Cited

U.S. PATENT DOCUMENTS

| | | | |
|---|---|---|---|
| 2014/0138378 A1 | 5/2014 | Lequeux | |
| 2014/0153767 A1 | 6/2014 | Hua | |
| 2014/0166658 A1 | 6/2014 | Hamra | |
| 2014/0176600 A1* | 6/2014 | Lee | G06T 3/40 345/625 |
| 2014/0233783 A1 | 8/2014 | Chardon et al. | |
| 2014/0264075 A1 | 9/2014 | LaPorte et al. | |
| 2014/0341399 A1 | 11/2014 | Dusse et al. | |
| 2014/0376763 A1 | 12/2014 | Stevinson | |
| 2015/0029112 A1 | 1/2015 | Macours | |
| 2015/0055813 A1 | 2/2015 | Ingraham | |
| 2015/0155661 A1 | 6/2015 | Chen et al. | |
| 2015/0156297 A1* | 6/2015 | Crawford | H02J 50/10 455/26.1 |
| 2015/0163582 A1 | 6/2015 | Aase | |
| 2015/0200558 A1 | 7/2015 | Castillo et al. | |
| 2015/0207907 A1 | 7/2015 | Eisele et al. | |
| 2015/0208179 A1 | 7/2015 | Chang et al. | |
| 2015/0241195 A1 | 8/2015 | Schenkewitz et al. | |
| 2015/0245125 A1 | 8/2015 | Shaffer | |
| 2015/0245126 A1 | 8/2015 | Shaffer | |
| 2015/0245127 A1 | 8/2015 | Shaffer | |
| 2015/0245723 A1 | 9/2015 | Alexander | |
| 2015/0255905 A1 | 9/2015 | Little et al. | |
| 2015/0256021 A1 | 9/2015 | Kwon et al. | |
| 2015/0307273 A1 | 10/2015 | Lyman | |
| 2015/0317008 A1 | 11/2015 | Chandran et al. | |
| 2015/0351271 A1 | 12/2015 | Dawson | |
| 2015/0364845 A1 | 12/2015 | Yu et al. | |
| 2015/0373448 A1 | 12/2015 | Shaffer | |
| 2016/0006292 A1 | 1/2016 | Hatanaka et al. | |
| 2016/0043518 A1 | 2/2016 | Lin | |
| 2016/0055632 A1 | 2/2016 | Fu et al. | |
| 2016/0073189 A1 | 3/2016 | Lindén et al. | |
| 2016/0093974 A1 | 3/2016 | Lai | |
| 2016/0134959 A1 | 5/2016 | Shaffer | |
| 2016/0134961 A1 | 5/2016 | Shaffer | |
| 2016/0142804 A1 | 5/2016 | Naito et al. | |
| 2016/0142807 A1 | 5/2016 | Aase | |
| 2016/0192055 A1 | 6/2016 | Liu et al. | |
| 2016/0219202 A1* | 7/2016 | Barros | H04N 5/2257 |
| 2016/0219358 A1 | 7/2016 | Shaffer et al. | |
| 2016/0234356 A1 | 8/2016 | Thomas et al. | |
| 2016/0268722 A1 | 9/2016 | Tsai et al. | |
| 2016/0277053 A1 | 9/2016 | Wong Chee | |
| 2016/0282899 A1 | 9/2016 | Inagaki et al. | |
| 2016/0357510 A1 | 12/2016 | Watson et al. | |
| 2016/0360350 A1 | 12/2016 | Watson et al. | |
| 2017/0013342 A1 | 1/2017 | Watson et al. | |
| 2017/0013875 A1 | 1/2017 | Schennum et al. | |
| 2017/0048604 A1 | 2/2017 | Hankey et al. | |
| 2017/0093079 A1 | 3/2017 | Wagman et al. | |
| 2017/0093453 A1 | 3/2017 | Panecki et al. | |
| 2017/0093454 A1 | 3/2017 | Chawan et al. | |
| 2017/0094381 A1 | 3/2017 | Leblanc et al. | |
| 2017/0094390 A1 | 3/2017 | Chawan et al. | |
| 2017/0094391 A1 | 3/2017 | Panecki et al. | |
| 2017/0094392 A1 | 3/2017 | Zörkendörfer et al. | |
| 2017/0094393 A1 | 3/2017 | Panecki et al. | |
| 2017/0094394 A1 | 3/2017 | Mcpeak et al. | |
| 2017/0094395 A1 | 3/2017 | Mcpeak et al. | |
| 2017/0094396 A1* | 3/2017 | Chandramohan | H04R 1/345 |
| 2017/0094397 A1 | 3/2017 | Wagman et al. | |
| 2017/0094398 A1 | 3/2017 | Cousins et al. | |
| 2017/0094399 A1* | 3/2017 | Chandramohan | B65D 25/02 |
| 2017/0154421 A1 | 6/2017 | Fu et al. | |
| 2017/0215293 A1* | 7/2017 | Merenda | A45C 13/02 |
| 2017/0238087 A1 | 8/2017 | Chawan et al. | |
| 2017/0245038 A1 | 8/2017 | Chawan et al. | |
| 2017/0347182 A1 | 11/2017 | Chawan et al. | |
| 2018/0091884 A1* | 3/2018 | Minoo | H04R 1/1091 |
| 2018/0131847 A1* | 5/2018 | Kokonaski | H04N 5/23241 |
| 2018/0359556 A1* | 12/2018 | Kosider | G06F 3/0383 |
| 2020/0068286 A1* | 2/2020 | Schrems | H04M 1/0262 |
| 2020/0086513 A1* | 3/2020 | Ambielli | B25G 1/08 |

FOREIGN PATENT DOCUMENTS

| | | |
|---|---|---|
| CN | 102474695 | 5/2012 |
| CN | 102612464 | 7/2012 |
| CN | 102761344 | 10/2012 |
| CN | 103078365 | 5/2013 |
| CN | 202997644 | 6/2013 |
| CN | 103429032 | 12/2013 |
| CN | 103517173 | 1/2014 |
| CN | 204090096 | 1/2015 |
| CN | 104378709 | 2/2015 |
| CN | 204243795 | 4/2015 |
| CN | 106551494 | 4/2017 |
| CN | 106559719 | 4/2017 |
| CN | 106559720 | 4/2017 |
| CN | 106559721 | 4/2017 |
| CN | 106560113 | 4/2017 |
| CN | 106560114 | 4/2017 |
| CN | 106617580 | 5/2017 |
| CN | 206150698 | 5/2017 |
| CN | 206314705 | 7/2017 |
| CN | 206314706 | 7/2017 |
| CN | 206314707 | 7/2017 |
| CN | 206354604 | 7/2017 |
| CN | 206603376 | 11/2017 |
| CN | 206620243 | 11/2017 |
| CN | 206949751 | 2/2018 |
| DE | 102009033898 B3 | 11/2015 |
| DK | 201770337 | 5/2017 |
| DK | 201770347 | 5/2017 |
| DK | 201770348 | 5/2017 |
| DK | 201770349 | 5/2017 |
| DK | 201770350 | 5/2017 |
| DK | 201770351 | 5/2017 |
| DK | 201770352 | 5/2017 |
| EP | 1427648 | 7/2008 |
| EP | 2098948 | 9/2009 |
| EP | 2441625 | 4/2012 |
| EP | 2469303 A1 | 6/2012 |
| EP | 1346483 B1 | 8/2013 |
| EP | 2665023 A1 | 11/2013 |
| EP | 2677767 | 12/2013 |
| EP | 2876777 | 5/2015 |
| EP | 3054703 A1 | 8/2016 |
| EP | 3101867 A1 | 12/2016 |
| EP | 3151583 | 4/2017 |
| EP | 3151584 | 4/2017 |
| EP | 3157265 | 4/2017 |
| GB | 2445388 A | 7/2008 |
| HK | 1234970 | 3/2008 |
| HK | 1235196 | 3/2008 |
| JP | 60070285 | 4/1985 |
| JP | 60237729 | 11/1985 |
| JP | 2005512858 | 5/2005 |
| JP | 2006504304 | 2/2006 |
| JP | 3143722 | 7/2008 |
| JP | 2010534978 | 11/2010 |
| JP | 2011016352 | 1/2011 |
| JP | 2012019495 | 1/2012 |
| JP | 2012100248 A | 5/2012 |
| JP | 2014014074 | 1/2014 |
| JP | 3192908 | 8/2014 |
| JP | 2015109542 | 6/2015 |
| JP | 2015109785 | 6/2015 |
| JP | 6165951 | 6/2017 |
| JP | 2017098943 | 6/2017 |
| JP | 2017099259 | 6/2017 |
| JP | 2017108606 | 6/2017 |
| JP | 2017112595 | 6/2017 |
| KR | 1020140044516 | 4/2014 |
| KR | 101494199 | 2/2015 |
| KR | 10200477291 | 5/2015 |
| KR | 101494299 | 2/2017 |
| KR | 101829140 | 2/2018 |
| KR | 101830397 | 2/2018 |
| TW | 579633 | 3/2004 |
| TW | M404402 | 5/2011 |
| TW | 201440536 | 10/2014 |
| TW | 201720332 | 6/2017 |

(56) References Cited

FOREIGN PATENT DOCUMENTS

| TW | 201722169 | 6/2017 |
|---|---|---|
| TW | 201724873 | 7/2017 |
| TW | 201728097 | 8/2017 |
| WO | 2004007180 | 1/2004 |
| WO | 2006070066 | 7/2006 |
| WO | 2007101439 A1 | 9/2007 |
| WO | 2008118478 A1 | 10/2008 |
| WO | 2009158635 A2 | 12/2009 |
| WO | 2011018086 A1 | 2/2011 |
| WO | 2012022021 A1 | 2/2012 |
| WO | 2014155367 A1 | 10/2014 |
| WO | 2014209374 A1 | 12/2014 |
| WO | 2015050072 A1 | 4/2015 |
| WO | 2015050073 A1 | 4/2015 |
| WO | 2015057052 A1 | 4/2015 |
| WO | 2015126572 A1 | 8/2015 |
| WO | 2017058675 A1 | 4/2017 |

OTHER PUBLICATIONS

US 9,826,301 B2, 11/2017, Chawan et al. (withdrawn)
SERVO R25 Mobile Phone Dual SIM Card with Bluetooth 5.0 TWS Wireless Earphones 6000mAh Power Bank GSM GPRS Cell Phone; Date first available Feb. 15, 2019 (Year: 2019).*
Brezinski, Mark, "Sennheiser MX W1 Headphones Review, The MX W1s seem to be more of a tech demo than an actual consumer item" from Reviewed.com, printed from http://headphones.reviewed.com/content/sennheiser-mx-w1-headphones-review-769, on Dec. 17, 2016, 9 pages.
Simger Beats Wireless Earbud Headphones Review, by Nerd Techy, Your Guide to New Technolgoy, printed from http://nerdtechy.com/simger-beats-review on Dec. 15, 2016. 9 pages.
Nokia J (BH-806), Issue 2.0, Nokia, 2011, Manual PDF Download in 10 pages available at: https://www.nokia.com/en_int/phones/sites/default/files/user-gides/Nokia_BH-806_UG_en.pdf.
U.S. Appl. No. 15/071,177 in 143 pages.
U.S. Appl. No. 11/824,453 in 188 pages.
U.S. Appl. No. 15/076,271 in 193 pages.
Ugale, et al., A Location-Based Personal Task Reminder for Mobile Users in Wireless College Campus Environment (Indoor and Outdoor); International Journal of Computer Techniques, vol. 2, Issue 1, (2005) in 7 pages.
International Search Report and Written Opinion for PCT Application No. PCT/US2016/035911 in 11 pages.
International Search Report and Written Opinion for PCT Application No. PCT/US2016/033972 in 14 pages.
Article entitled: "Siri vs. Cortana—Happy Anniversary (Commercial)," Nokia Ira8, Published on Jul. 28, 2014, 1 page.
Article entitled: "Launch Files & Applications ona Scheduled Date with Calendar for Mac OS X," OSXDaily, dated Apr. 15, 2013, printed from [BNSDOCKID:<XP55285939A>5/launch-file-app-scheduled-date-mac-os-x/ in 5 pages.
Article entitled: "How to Automatically Run Programs and Set Reminders With the Windows Task Scheduler," printed on May 7, 2016 13:33 from [BNSDOCKID:<XP55285937A>23393/how-to-automatically-run-programs-and-set-reminders-with-the-windows-task-scheduler in 7 pages.
Notice of Allowance with notification dated Jun. 6, 2016 for U.S. Appl. No. 14/731,249 in 11 pages.
Article entitled: "Like Trigger?" Copyright 2013-2015, Egomotion Corp., printed from http://gettrigger.com/ in 5 pages.
Annex to Form PCT/ISA/206 Communication Relating to the Results of the Partial International Search Report for PCT Application No. PCT/US2016/053580 in 9 pages.
Office Action dated Jan. 26, 2017 from China in Application No. 201621078697.5 in 4 pages.
Office Action dated Feb. 8, 2017 in U.S. Appl. No. 15/275,366 in 14 pages.

Hoffman, Chris, "How to Automatically Run Programs and Set Reminders With the Windows Task Scheduler," Geek Article in 7 pages. Publication date Aug. 31, 2012.
Article entitled: Skybuds—truly wireless earbuds and smartphone case by Alpha Audiotronics, Inc, Kickstarter, available at: http://web.archive.org/web/20160329093740/https://www.kickstarter.com/projects/421230074/skybuds-truly-wireless-earbuds-and-smartphone-case/description, Mar. 29, 2016, 37 pages.
Office Action issued in China Patent Application No. CN201621079333.9, dated Feb. 8, 2017, 3 pages.
Office Action issued in China Patent Application No. 201621079334.3, dated Feb. 23, 2017, 3 pages.
Office Action issued in China Patent Application No. 201621079342.8, dated Feb. 23, 2017, 4 pages.
Office Action issued in China Patent Application No. 201621079467.0, dated Feb. 22, 2017, 4 pages.
Office Action issued in China Patent Application No. 201621079468.5, dated Feb. 23, 2017, 4 pages.
Office Action issued in China Patent Application No. 201621079469.X, dated Feb. 23, 2017, 3 pages.
Bestsound Technology, "How to Charge Siemens Hearing Aids with eCharger", YouTube Internet Citation, XP-002767611, dated Feb. 13, 2015, printed from https//www.youtube.com/watch=Y6ZM7SpziA (BNSDOCID:<XP2767611A1> in 1 page.
First Notification to Make Rectification issued in China Patent Application No. CN201621078698.X, dated Mar. 15, 2017, 3 pages.
Office Action issued in China Patent Application No. CN201621078698.X, dated Mar. 15, 2017, 3 pages.
Extended European Search Report issued in European Patent Application No. EP16190175.6, dated Mar. 15, 2017, 12 pages.
Extended Search Report issued in European Patent Application No. EP16190180.6,, dated Mar. 15, 2017, 11 pages.
Partial Search Report issued in European Patent Application No. EP16190189.7, dated Mar. 16, 2017, 9 pages.
Extended Search Report issued in European Patent Application No. EP16190200.2, dated Mar. 7, 2017, 13 pages.
Extended Search Report issued in European Patent Application No. EP16190259.8, dated Mar. 15, 2017, 11 pages.
Siemens AG, "Siemens Accessories for Hearing Instruments: Designed to File Your Lifestyle", available at: https://media.sivantos.com/siemens-website/media/2014/05/Accessories_consumer-leaflet_2013-09_en.pdf, Sep. 10, 2013, 8 pages.
First Action Interview Pilot Program Pre-Interview Communication in U.S. Appl. No. 15/273,675, dated Jun. 2, 2017, in 4 pages.
First Action Interview Pilot Program Pre-Interview Communication in U.S. Appl. No. 15/273,693, dated Apr. 18, 2017, in 4 pages.
Notice of Allowance in U.S. Appl. No. 15/273,693, dated May 23, 2017, in 9 pages.
Non-Final Office Action issued in U.S. Appl. No. 15/273,694, dated May 15, 2017 in 8 pages.
Notice of Allowance in U.S. Appl. No. 15/275,364, dated Apr. 3, 2017, in 18 pages.
Supplemental Notice of Allowance in U.S. Appl. No. 15/275,364, dated Apr. 19, 2017, in 2 pages.
Supplemental Notice of Allowance issued in U.S. Appl. No. 15/275,364, dated Jun. 21, 2017, in 6 pages.
Notice of Allowance issued in U.S. Appl. No. 15/275,366, dated Jun. 7, 2017, in 19 pages.
First Examination Report issued in Australia Application No. AU2016231632, dated Jun. 2, 2017 in 7 pages.
Office Action issued in China Application No. CN201621078698.X, dated Mar. 15, 2017, in 3 pages.
Avery Hartmans, article entitled "These beautiful wireless earbuds are a worthy alternative to Apple's AirPods", Skybuds wireless earbuds, from Alpha Audiotronics: Review, Photos—Business Insider, dated Mar. 9, 2017 in 11 pages. Printed from http://www.businessinsider.com/skybuds-wireless-earbuds-alpha-audiotronic,s-review-phot, Mar. 14, 2017.
Notice of Allowance issued in Japanese Application No. JP2016-186287, dated May 22, 2017, in 4 pages.
Office Action issued in Korean Application No. KR10-2016-0122237, dated May 22, 2017, in 13 pages.

(56) References Cited

OTHER PUBLICATIONS

Office Action issued in Korean Application No. KR10-2016-0122269, dated May 22, 2017, 11 pages.
International Search Report and Written Opinion issued in PCT Application No. PCT/US2016/053580, dated Apr. 5, 2017, 26 pages.
Office Action issued in Taiwan Application No. TW105130923, dated May 9, 2017, in 6 pages.
First Action Interview Pilot Program Pre-Interview Communication in U.S. Appl. No. 15/273,677, dated Jul. 12, 2017, in 4 pages.
Supplemental Notice of Allowance in U.S. Appl. No. 15/275,364, dated Jul. 21, 2017, in 6 pages.
First Action Interview Pilot Program Pre-Interview Communication, in U.S. Appl. No. 15/588,400, dated Jul. 20, 2017, in 5 pages.
First Action Interview Pilot Program Pre-Interview Communication, in U.S. Appl. No. 15/588,444, dated Jul. 12, 2017, in 6 pages.
First Examination Report for Australia Application No. AU2016231631, dated Jun. 14, 2017, 2 pages.
Office Action for China Application No. CN201621078698.X, dated Jul. 11, 2017, 4 pages.
Notice of Decision to Grant for China Application No. CN201621079342.8, dated Jun. 26, 2017.
Office Action for Danish Application No. DKPA 2017 70347, dated Jul. 11, 2017 in 10 pages.
Office Action for Danish Application No. DKPA201770350, dated Aug. 3, 2017 in 9 pages.
Extended European Search Report for European Application No. EP16190189.7, dated Jun. 21, 2017 in 13 pages.
Extended European Search Report for European Application No. EP16190209.3, dated Jul. 6, 2017 in 11 pages.
Extended European Search Report for European Application No. EP16190260.6, dated Jul. 6, 2017 in 10 pages.
Decision of Grant for Japanese Application No. JP2016-186287, dated May 22, 2017 in 4 pages.
Youtube Video: How to charge Siemens hearing aids with eCharger, Siemens, by BestSound Technology, Published on Feb. 13, 2015 and printed from https://www.youtube.com/watch?v=-Y6ZM7SpziA.
Final Office Action in U.S. Appl. No. 15/273,675 , dated Aug. 31, 2017 in 20 pages.
First Action Interview Pilot Program Pre-Interview Communication, in U.S. Appl. No. 15/273,685, dated Aug. 31, 2017 in 4 pages.
First Examination Report for Australia Application No. AU2016231629, dated Aug. 17, 2017 in 4 pages.
First Examination Report for Australia Application No. AU2016231633, dated Aug. 18, 2017 in 5 pages.
Notice of Decision to Grant for China Application No. CN201621079333.9, dated Aug. 22, 2017 in 2 pages.
Notice of Decision to Grant for China Application No. CN201621079334.3, dated Jul. 17, 2017.
Notice of Decision to Grant for China Application No. CN201621079467.0, dated Aug. 16, 2017.
Office Action for Danish Application No. DKPA 2017 70337, dated Aug. 31, 2017 in 8 pages.
Office Action for Danish Application No. DKPA 2017 70348, dated Aug. 25, 2017 in 8 pages.
Office Action for Danish Application No. DKPA 2017 70349, dated Sep. 12, 2017 in 8 pages.
Office Action for Danish Application No. DKPA 2017 70351, dated Sep. 12, 2017 in 11 pages.
Office Action for Korean Application No. KR10-2016-0122143, dated Aug. 30, 2017 in 5 pages.
Notice of Decision to Grant in China Application No. CN201621078698.X, dated Sep. 19, 2017 in 2 pages.
Office Action in China Application No. CN201621078698.X, dated Jul. 11, 2017 in 4 pages.
Office Action in Danish Application No. DKPA201770352, dated Sep. 20, 2017 in 9 pages.
First Examination Report in Australia Application No. AU2016231629, dated Aug. 17, 2017.

Ugale et al., "A Location-Based Personal Task Reminder for Mobile Users in Wireless College Campus Environment (Indoor and Outdoor)," International Journal of Computer Techniques, vol. 2, Issue 1, ISSN:2394-2231 in 7 pages (2015).
Non-Final Office Action for U.S. Appl. No. 14/198,884, dated Sep. 29, 2017 in 11 pages.
Notice of Allowance for U.S. Appl. No. 15/588,444, dated Nov. 2, 2017 in 15 pages.
Office Action for Japan Application No. JP2016-186288, dated Nov. 6, 2017 in 8 pages.
Office Action for Japan Application No. JP2016-186290, dated Nov. 6, 2017 in 8 pages.
Office Action for Taiwan Application No. TW105130920, dated Oct. 23, 2017 in 6 pages.
Non-Final Office Action for U.S. Appl. No. 15/273,683, dated Nov. 16, 2017 in 10 pages.
Notice of Allowance for U.S. Appl. No. 15/273,685, dated Nov. 29, 2017 in 8 pages.
Non-Final Office Action for U.S. Appl. No. 15/273,691, dated Nov. 15, 2017 in 13 pages.
Notice of Decision to Grant for Korean Application No. KR10-2016-0122237, dated Nov. 9, 2017 in 3 pages.
Notice of Decision to Grant for Korean Application No. KR10-2016-0122269, dated Nov. 8, 2017 in 3 pages.
Office Action for Korean Application No. TW105130921, dated Nov. 22, 2017 in 8 pages.
Office Action for Korean Application No. TW105130923, dated Dec. 6, 2017 in 4 pages.
First Action Interview Pilot Program Pre-Interview Communication issued in U.S. Appl. No. 15/273,671, dated Jan. 10, 2018 in 4 pages.
First Action Interview Pilot Program Pre-Interview Communication issued in U.S. Appl. No. 15/273,696, dated Jan. 18, 2018 in 5 pages.
Notice of Allowance issued in U.S. Appl. No. 15/273,696, dated May 4, 2018 in 19 pages.
Office Action issued in Japanese Application No. JP2016-186289, dated Jan. 9, 2018 in 5 pages.
First Action Interview Pilot Program Pre-Interview in U.S. Appl. No. 15/273,687, dated Jan. 25, 2018 in 3 pages.
First Action Interview Pilot Program Pre-Interview Communication in U.S. Appl. No. 15/273,690, dated Feb. 9, 2018 in 5 pages.
Notice of Allowance in U.S. Appl. No. 15/680,095, dated Dec. 27, 2017 in 10 pages.
First Action Interview Pilot Program Pre-Interview Communication in U.S. Appl. No. 15/851,348, dated Jan. 31, 2018 in 3 pages.
First Examination Report in Australia Application No. AU2017279776, dated Jan. 22, 2018 in 3 pages.
Office Action in China Application No. CN201610848841.7, dated Jan. 2, 2018 in 10 pages.
Office Action in China Application No. CN201610848843.6, dated Dec. 12, 2017 in 22 pages.
Office Action in China Application No. CN201610849637.7, dated Dec. 28, 2017 in 16 pages.
Office Action in China Application No. CN201610849639.6, dated Dec. 21, 2017 in 16 pages.
Office Action in German Application No. DKPA201770347, dated Jan. 26, 2018 in 6 pages.
Office Action in PCT Application No. EP16190180.6, dated Feb. 13, 2018 in 5 pages.
Office Action in Korea Application No. KR10-2016-0122189, dated Feb. 5, 2018 in 10 Pages.
Notice of Decision to Grant in Taiwan Application No. TW105130924, dated Jan. 22, 2018 in 5 pages.
First Action Interview Pilot Program Pre-Interview Communication in U.S. Appl. No. 15/273,698, dated Mar. 21, 2018 in 8 pages.
Office Action in Danish Application No. DKPA 2017 70348, dated Mar. 7, 2018 in 4 pages.
Office Action in Danish Application No. DKPA 2017 70350, dated Mar. 7, 2018 in 7 pages.
Notice of Decision to Grant in Japanese Application No. JP2016-186288, dated Feb. 26, 2018 in 3 pages.
Notice of Decision to Grant in Japanese Application No. JP2016-186290, dated Mar. 5, 2018 in 3 pages.

(56) References Cited

OTHER PUBLICATIONS

Notice of Decision to Grant in Japanese Application No. JP2018-018945, dated Mar. 5, 2018 in 3 pages.
Office Action in Korean Application No. KR10-2016-0122287, dated Feb. 20, 2018 in 5 pages.
Final Office Action in Taiwan Application No. TW105130920, dated Feb. 23, 2018 in 4 pages.

* cited by examiner

MULTIFUNCTION ACCESSORY CASE

CROSS-REFERENCES TO RELATED APPLICATIONS

This application claims priority to U.S. Provisional Patent Application No. 62/733,905, filed Sep. 20, 2018, entitled "Multifunction Accessory Case," which is herein incorporated by reference in its entirety and for all purposes.

FIELD

The described embodiments relate generally to multifunction charging and storage cases for portable listening devices such as earbuds.

BACKGROUND

As wearable devices, such as smart watches, achieve greater connectivity and improved capabilities, users are opting to reply primarily on their wearable device for communications and connectivity by leaving their smart phones and/or other mobile devices behind as a matter of convenience. While some modern wearable devices allow for cellular communication, using the microphone and speaker on a wearable device for phone calls can be less than optimum experience. Thus, users often carry wireless headphones, such as earbuds and their accompanying storage cases, with them to listen to music while running, bicycling, or simply carrying out daily errands or activities. Using the paired wireless headphones allows for a more natural user experience for telephone calls from the wearable device. While many users are choosing to operate at times without their mobile devices, some mobile devices can provide additional features, such as a camera, that that are either not implemented on or have limitations in embodiments of wearable devices. For example, digital cameras built into a wearable device might have drawbacks due to space constraints of the wearable device and/or limited degrees of freedom for use because the wearable device can be, for example, attached to a wrist of a user.

SUMMARY

Embodiments of the disclosure pertain to a multifunction case that can be used to charge and store wireless earbuds or other headphones. Users often use wireless earbuds in conjunction with either a mobile device or a wearable device. Storage cases for wireless earbuds or other headphones can be designed to store and charge the earbuds when not in use. Users often carry the case for the wireless earbuds with them due to the compact size, the protection the case provides for the earbuds while not in use, and the ability to charge the earbuds. According to embodiments of the disclosure, additional features can be incorporated into a charging and storage case for wireless earbuds that supplement the existing features of a wearable device (or other host device) that the earbuds can be paired with. One such feature can be a digital camera.

Some embodiments of the invention pertain to a charging and storage case for a pair of earbuds that includes a digital camera. The camera can include a lens positioned at an exterior surface of a housing for the charging case, digital processing circuitry, a computer-readable memory, and communication circuitry—all of which can be incorporated into the charging case. In some embodiments a charging and storage case can further include one or more of a shutter button, a strobe light, a microphone and/or a speaker that can work in conjunction with the camera and/or provide other features for the charging case. For example, a shutter button can be incorporated into the housing of the case to activate the digital camera, a strobe light can be included to provide a flash for use with the camera, a microphone can be included to capture audio for videos, to use with video conferencing features or to capture voice-activated or other audible commands to control the camera or other features of the charging case, and a speaker can be included to provide sound separate from the headphones.

A charging and storage case for a pair of earbuds according to some embodiments of the disclosure pertain can include a housing, a lid, a case battery and charging circuitry. The housing can include one or more cavities sized and shaped to receive the earbuds. The lid can be attached to the housing and moved between an open position that allows the earbuds to be placed within and removed from the storage case and a closed position the covers and protects the earbuds. The case battery and charging circuitry can be configured to initiate charging of one or both of the earbud that can be stored in the case when the earbuds are placed into their respective cavities. According to embodiments, the charging and storage case can further include a digital camera that is powered by the case battery and can include communications circuitry that enables photos or video taken by the camera to be transferred to a second electronic device. The digital camera can include a lens mounted to the housing, digital processing circuitry, and a memory for storing digital images captured by the camera. The communications circuitry can be configured to transmit the digital images from the memory to the second electronic device, such as a host device. In some embodiments the communications circuitry can provide a wireless connection to the second electronic device, in some embodiments the communications circuitry can provide a wired connection to the second device and in some embodiments the communication circuitry can provide both wireless and wired connections.

Embodiments of a charging and storage case for a pair of earbuds can further include one or more of: a speaker disposed within the housing and operatively coupled to emit sound through a speaker port formed in the housing, a microphone disposed within the housing and operatively coupled to receive sound through a microphone port formed in the housing, a strobe coupled to the housing and configured to provide a flash for the camera, a shutter button positioned at an exterior surface of the housing and operatively coupled to circuitry within the charging case to activate the digital camera to take a photograph or video, a display disposed at an exterior surface of the housing operatively coupled to circuitry within the charging case to enable the display to act as a view finder for the digital camera and to display images captured by the digital camera, and a wireless power receiving element configured to wirelessly receive power from a wireless charger and charge the case battery from the received power.

To better understand the nature and advantages of the present disclosure, reference can be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the embodiments by one skilled in the art without departing from the spirit and scope of the disclosure. The embodiments can be readily understood by the following detailed description in conjunction with the accompanying drawings, wherein like reference numerals designate like structural elements, and in which.

DETAILED DESCRIPTION

Embodiments of the disclosure pertain to multifunctional accessory cases for electronic devices. Embodiments pertain to a case for a portable listening device, such as a pair of headphones or a pair of wireless earbuds. The case can include one or more cavities to hold the listening device and charging circuitry to provide power to a rechargeable battery within the listening device (or within each of the pair of earbuds). The embodiments can include a digital camera. The digital camera can include a lens mounted on the housing, digital processing circuitry, and a memory. In some embodiments the digital camera can be powered by a rechargeable battery within the multifunction storage case.

As used herein, the term "portable listening device" includes any portable device designed to play sound that can be heard by a user. Headphones are one type of portable listening device, portable speakers are another. The term "headphones" represents a pair of small, portable listening devices that are designed to be worn on or around a user's head. Headphones can convert an electrical signal to a corresponding sound that can be heard by the user. Headphones include traditional headphones that are worn over a user's head and include left and right listening devices connected to each other by a headband, headsets (a combination of a headphone and a microphone); and earbuds (very small headphones that are designed to be fitted directly in a user's ear). Traditional headphones include both over-ear headphones (sometimes referred to as either circumaural or full-size headphones) that have earpads that fully encompass a user's ears, and on-ear headphones (sometimes referred to as supra-aural headphones) that have earpads that press against a user's ear instead of surrounding the ear. As used herein, the term "earbuds," which can also be referred to as earphones or ear-fitting headphones, includes both small headphones that fit within a user's outer ear facing the ear canal without being inserted into the ear canal, and in-ear headphones, sometimes referred to as canalphones, that are inserted in the ear canal itself.

Figure 1:
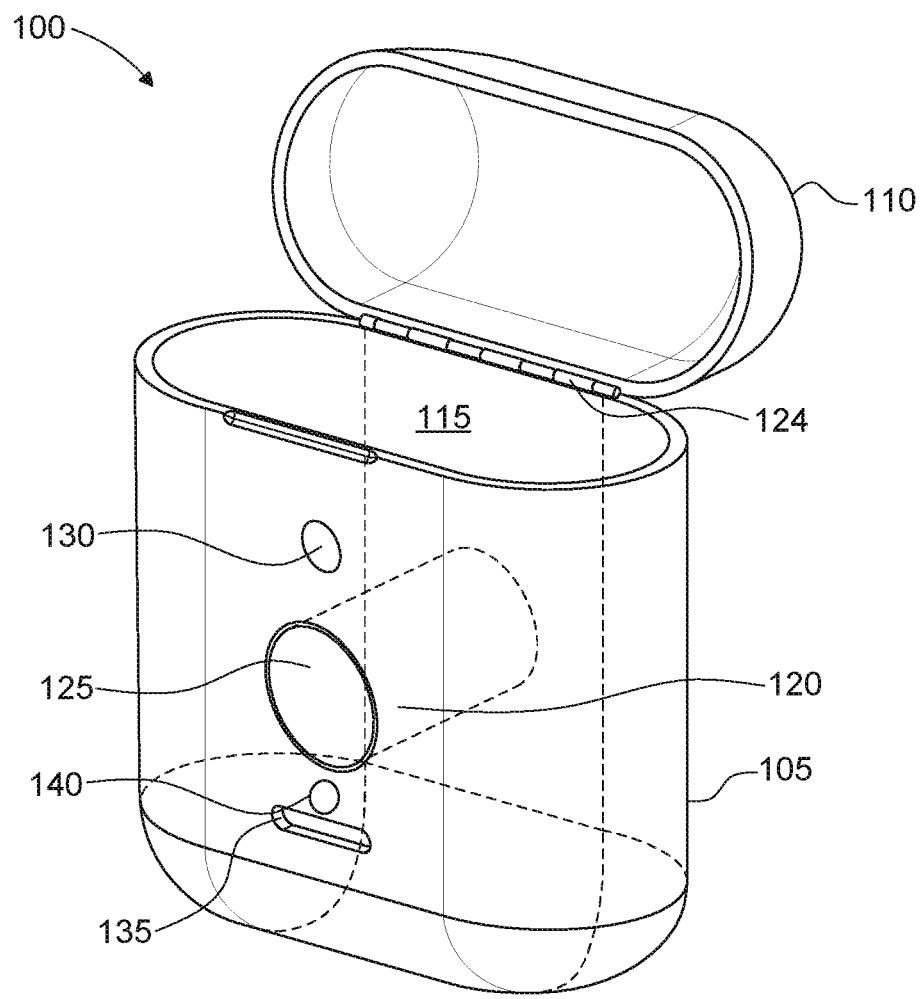
FIG. 1 illustrates a simplified front perspective view of an earbud case according to some embodiments of the disclosure.

FIG. 1 illustrates a simplified front perspective view of a multifunction accessory case 100 according to some embodiments of the disclosure. Multifunction accessory case 100 includes a housing 105, also called a body, and a lid 110 that can be pivotably coupled to housing 105 by a hinge 124. Housing 105 defines an interior space in which a pair of earbuds (not shown) can be stored.

In some embodiments, an insert can be fit within the interior space of the housing 105 to define one or more cavities that are sized and shaped to accept the earbuds. An example of such an insert is below with respect to FIG. 7. In some embodiments, cavities can be positioned adjacent to each other on opposite sides of a center plane of case 100. Each cavity can be sized and shaped to match that of its respective earbud. Each cavity can include a stem section and a bud section. Each stem section can be an elongated generally cylindrical cavity that extends from its respective bud section towards a bottom of case 100. Each bud section can be offset from its respective stem section and open at an upper surface of housing 105. Embodiments of the disclosure are not limited to any particular shape, configuration or number of cavities and in other embodiments cavities can have different shapes to accommodate different types of earbuds, different configurations and/or can be a single cavity or more than two cavities.

Lid 110 can be moved between a closed position in which the lid covers the interior space and an open position (illustrated in FIG. 1) in which an opening 115 of the housing can be exposed to allow a user to place the earbuds within or remove the earbuds from the interior space. Lid 110 can be operable between a closed position where lid 110 can be aligned over one or more cavities fully enclosing pair of earbuds within the housing, and an open position where the lid 110 can be displaced from the housing and cavities such that a user can remove the earbuds from the cavities or replace the earbuds within the cavities. Lid 110 can be pivotably attached to housing 105 and can include a magnetic or mechanical system (not shown in FIG. 1) that provides lid 110 with a bi-stable operation.

In some embodiments, case 100 can also include a charging system configured to charge pair of earbuds; one or more magnets configured to orient and retain the pair of earbuds within one or more cavities; and other features that are further described below. While not shown in FIG. 1, earbud case can include a battery that can be charged by charging circuitry that is separate from a charging system to charge the earbuds. In some embodiments, case 100 can also include a receptacle connector (not shown) that has an opening at an exterior surface of case 100. A suitable plug connector can be inserted in the opening to mate with the receptacle connector and transfer power to case 100 (e.g., from a charging cable) and/or to transfer data between case 100 and another device. Receptacle connector can be, for example, a mini-universal serial bus (USB) connector, a micro-USB connector, a USB type C connector, a Lightning connector developed by Apple Inc., the assignee of the present application, or any other appropriate connector.

Multifunction accessory case 100 can also include one or more wireless power receiving elements (not shown) that can wirelessly receive power from a wireless transmitter (e.g., a wireless transmitting coil) and provide the power to the charging circuitry. For example, in some embodiments a flat or pancake style wireless power receiving coil can be included within housing 105 adjacent to a back surface of the housing. The charging case 105 can then be placed upon a wireless charging device, with its back facing the charging device and the wireless power receiving coil aligned with a wireless power transmitting coil of the wireless power charging device. As another example, case 100 can include a flat or pancake style wireless power receiving coil at a bottom surface of the case and the case can be wirelessly charged by standing the case upright upon a wireless charging device. In still other embodiments, case 100 can include a solenoid or other type of wireless power receiving coil.

Multifunction accessory case 100 can also include a digital camera 120. The digital camera 120 can include a lens 125 that can be mounted on (e.g., press fit into) the housing 105 of the multifunction accessory case 100. In some embodiments the digital camera 120 can be operated to take digital still images (photographs), Live Photos and video. Camera 120 can include digital processing circuitry (not shown) and a memory (not shown). The digital camera 120 can receive electrical power from the case battery (not shown). In some embodiments, the multifunction accessory case 100 can include multiple digital cameras on multiple sides of the housing 105.

In some embodiments, the digital camera can support augmented reality (AR) or virtual reality (VR) applications by providing an additional digital camera for a different viewpoint or vantage point. Also, in various embodiments the multifunction accessory case 100 can incorporate one or more lenses 125 on more than one side of the housing 105. The same digital processing circuitry and memory can be used to support the one or more lenses 125 and in some instances the images from the one or more lenses 125 can be combined to form a virtual wide angle lens. Also, in some embodiments, the digital camera 120 or the lenses 125 can be incorporated into the lid 110 for the multifunction accessory case 100 as described in more detail with respect to FIG. 4. The lid 110 can be pivoted to allow for additional orientations for the digital camera 120.

In some embodiments, the digital camera 120 of the multifunction accessory case 100 can be exchangeable with one or more different electronic components that can plug into a universal receiver of the housing 105 in place of camera 120 and the one or more lenses 125. The universal receiver can be a socket or other type of connector within a cavity or space of housing 105 that enables multiple different components to be plugged in or otherwise physically and electrically connected to accessory case 100. For example, in some embodiments one or more health sensors can be part of a module or lab-in-a-case that connects to the universal receiver connector and provides the ability to collect health related data. As specific examples, the one or more health sensors can include a temperature sensor or thermometer, an electrocardiograph (ECG) sensor, a blood glucose sensor, and/or a blood oxygen sensor among others.

In some embodiments, a vertical cavity surface emitting laser (VCSEL) module can be connected to the universal receiver connector. The VCSEL and an infrared (IR) receiver can be used for three dimensional (3D) scanning. Digital 3D maps can be created with the VCSEL and IR scanner and stored in the memory of the multifunction accessory case 100. The digital 3D maps can be transmitted to one or more electronic devices or a cloud storage system through a transmitter on the case 100. The multifunction accessory case 100 can be connected to a 3D printer for printing the captured images. The VCSEL and IR receiver can also be used for generating 3D images for augmented or virtual reality.

In some embodiments, case 100 can include a strobe 130 disposed at an exterior surface of housing 105 or disposed within housing 105 and coupled to project light through an opening in the housing. The strobe 130 can include a light emitting diode (LED) or a plurality of LEDs that can receive electrical power from the case battery. The strobe 130 can provide a flash for digital photos and a light source for digital video. In various embodiments, the strobe 130 can transmit digital messages such as indicating a current charge level for the case battery by a programmed sequence of flashes. The strobe 130 can be used as a flashlight with a steady beam or a flashing beacon with an intermittent beam and/or project a steady or programmable pattern of flashes. The strobe 130 can include multi-color LEDs (e.g., yellow, orange, red or yellow, orange, green). The different LED colors can provide visual indications of different functions (e.g., pairing, low battery, modes etc.).

Multifunction accessory case 100 can also include a speaker disposed within the housing and mounted such that it generates audio waves through a speaker opening 135 formed through a wall of housing 105 (for convenience and ease of discussion, the speaker and speaker opening are sometimes referred to herein as a single element referenced as "speaker 135"). The speaker 135 can project sound from the multifunction accessory case 100. In various non-limited examples, the speaker 135 can generate a shutter sound upon shutter activation. The speaker 135 can generate sound for audio or video playback for audio or video conferencing. The audio or video conferencing can be performed in conjunction with a paired mobile device or wearable device. The speaker 135 can generate one or more sounds as an audio beacon for locating a misplaced multifunction accessory case 100 following transmission of a wireless signal to the multifunction accessory case 100 from a companion device such as a smartphone or wearable device. The speaker 135 can generate a loud, shrill sound as a personal alarm to warn off or scare a potential attackers if the user is confronted with imminent danger from an attacker.

Multifunction accessory case 100 can also include a memory. The memory can be a flash type memory or other suitable type of memory to store digital assets or instructions for execution by the digital processing circuitry. In various embodiments, the memory can be one or more removable flash memory devices. The memory can synchronize with a memory of a companion device, such a wearable device or smartphone or a cloud-based storage device, to store digital assets.

Multifunction accessory case 100 can also include data communications circuitry configured to transmit digital assets from the memory to a second electronic device. The digital assets can include digital photographs, panorama images, slow motion images, screen captures, Live Photos, video, or audio information. The data communications circuitry of the multifunction accessory case 100 can also receive digital assets from the second electronic device. The data communications circuitry can also receive commands, e.g., shutter command, from another electronic device. In some embodiments, the second electronic device can include a mobile device such as a smartphone, a tablet computer, or a laptop or desktop computer. In some embodiments, the second electronic device can be a portable computing device. In some embodiments, the second electronic device can be a wearable electronic device such as an electronic watch. In some embodiments, the data communications circuitry can transmit the digital assets to a cloud server.

In some embodiments, the multifunction accessory case 100 can include a one or more sensors. Sensors can include accelerometers, compass, gyrometer, pressure sensors, audio sensors, light sensors, barometers, and the like. Sensors can be used to detect and measure aspects, such as auditory or light signatures, of an environment of the case's location. The sensors can be health-related such as capture the number of steps, motion, or heart rate of a user. In some embodiments, the sensors can be related to environmental conditions such as ambient temperature, humidity, particulate matter in the air, or carbon dioxide sensors. In some embodiments the earbuds can incorporate one or more sensors to provide multiple points for reference for motion capture that can be used to capture repetition counts for exercise. In some embodiments the sensors on the multifunction accessory case 100 or earbuds can integrate with the sensors on a paired wearable device or mobile device to provide overall data sensor fusion.

In some embodiments, case 100 can include one or more additional sensors. In a non-limiting example, the multifunction accessory case 100 can incorporate a satellite navigation system, such as a Global Positioning System (GPS) receiver, to obtain position information, timing information, altitude, or other navigation information. In some embodiments, the case 100 can include a Bluetooth Mesh sensor to obtain location data. In order to find the case 100 a user can query the mesh network nodes, to determine the node that last obtained the location of the case 100, the time and geographic location where the case 100 was detected. The mesh node that has the newest information and the strongest signal would likely be close to the location of the case 100 allowing a user to locate the case 100. Mesh nodes in a user's house network can be used to control light switches, monitor energy of appliances, adjust temperature sensors for a heating and ventilation air conditioning (HVAC) control unit. The location data can be used to find the multifunction accessory case 100 if misplaced. In some embodiments, multifunction accessory device can an include external port (e.g., USB, FireWire, Lightning connector, 160-pin connector, etc.). The external port can be adapted for coupling directly to other devices or indirectly over a network (e.g., the Internet, wireless local area network (LAN), etc.).

Multifunction accessory case 100 can also include a microphone disposed within the housing 105 and operable to receive sound through a microphone port 140 formed through a wall of housing 105 (for convenience and ease of discussion, the microphone and microphone opening are sometimes referred to herein as a single element referenced as "microphone 140"). The microphone 140 can receive audio information for video or Live Photos. The microphone 140 can also capture audio information for audio or video conferencing. The microphone 140 can receive audio information (e.g., aural instructions) for an intelligent assistant. The intelligent assistant can receive audio commands from a user to perform different functions of the multifunction accessory case 100. The location of the microphone 140 on the case 100 is exemplary. One or more locations for the microphone 140 can be selected based on ports or gaps between the internal electronic components of the case 100. Additionally, some embodiments can include multiple microphones for improved performance, to enable noise cancellation and/or to enable other features.

In some embodiments, external mounting structures (e.g., protuberances) can be formed on the housing 105 to allow the multifunction accessory case to be affixed to a case, a tripod, a helmet, or similar mounting structure. In some embodiments, external mounting structures on the housing 105 can connect to an external battery that can supplement or recharge the case battery.

In some embodiments, the multifunction accessory case 100 can be water resistant. As defined herein, a liquid-tight seal shall mean a seal that conforms to one or more of the following ratings as defined by the International Protection Rating and International Electrochemical Commission (IEC) 60529 that can also be known as the I.P.68 rating. In some embodiments the liquid-tight seal can protect the connector assembly against the harmful ingress of water.

Figure 2:
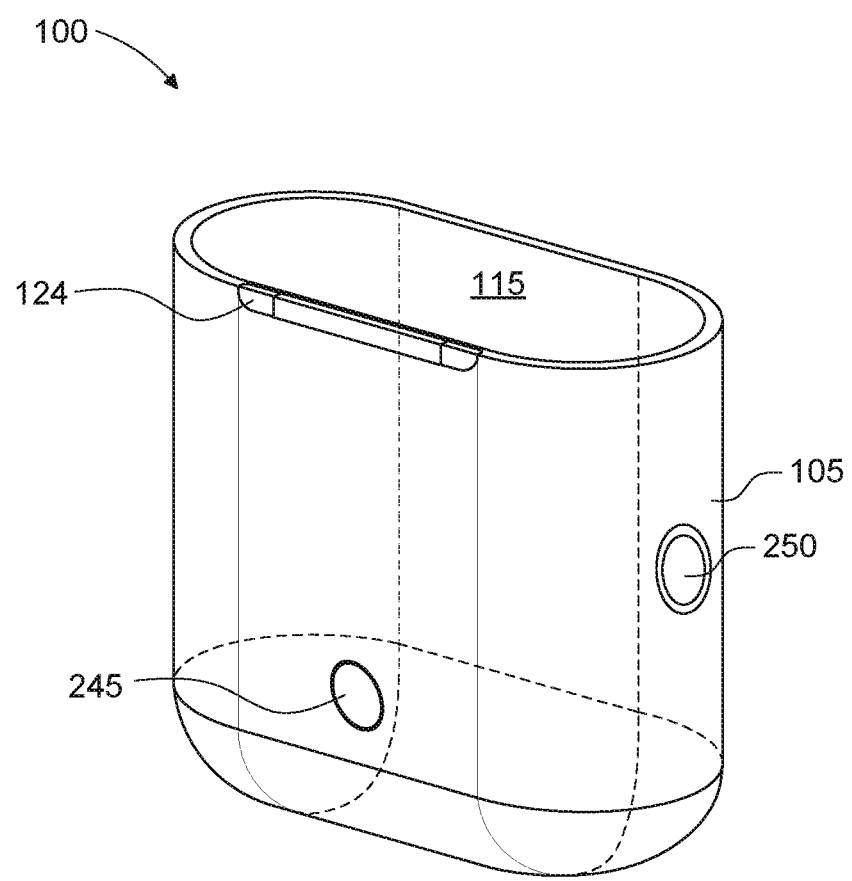
FIG. 2 illustrates a simplified rear perspective view of the earbud case shown in FIG. 1.

The accessory case 100 can also include thermal heat spreaders and/or heat synchs distributed throughout the case 100. The camera 120 and other circuitry within case 100 can generate heat, especially during camera operation with preview mode. Heat spreaders and/or heat synchs can be embedded or molded into the case 100 or can be separate elements that are thermally coupled to the camera or other heat generating components. The case 100 can be constructed from materials with different thermal characteristics, such as plastic, graphite, or metallic alloys, to help distribute heat from the camera and other internal electronics to external surfaces of the case where heat is more readily dissipated. As one example, in some embodiments the body 105 and/or lid 110 of case 100 can be predominantly made from a polymer-based plastic material doped with a thermally conductive material, such as graphene, to improve heat dissipation FIG. 2 illustrates a simplified rear perspective view of the multifunction accessory case 100 depicted in FIG. 1 shown without lid 110 for ease of illustration. FIG. 2 illustrates a second major side of the housing 105 opposite the first major side visible in FIG. 1 that includes the digital camera lens 125. As shown in FIG. 2, first and second buttons 245 and 250 can be positioned at an exterior surface of the housing 105. The first and second buttons 245 and 250 can be used to receive input from a user and carry out various functions that can be implemented by case 100. As an example, the first button 245, which is shown in FIG. 2 as being positioned on the rear, major surface of housing 105, can be used for pairing the earbuds stored within or matched to case 100 with another electronic device (e.g., a wearable device, a smartphone or a tablet). As another example, the second button 250, which is shown in FIG. 2 as being positioned on a side surface of housing 105 that extends between the two major sides of the housing, can activate the camera mode of the multifunction accessory case 100 can act as a shutter button for the digital camera 120. For example, the second button can start, pause, and/or stop video capture from the digital camera 120. Placing button 250 on the side of housing 105 can facilitate one-handed operation of the digital camera 120 by providing a convenient location to activate the camera shutter when the camera is pointed towards its subject.

In some embodiments, multifunction accessory case 100 includes just a single user interface button that can be used to activate all the functions of the first and second buttons 245, 250 or different functions. Other embodiments can include voice-activated controls, in addition to or instead of buttons 245, 250, to operate accessory case 100 in camera mode and/or perform other functions for the accessory case. Still other embodiments can activate modes of case 100 by tapping on one or more of the earbuds stored in the case or when the earbuds are worn by a user. For example, when case 100 is in camera mode, tapping on one of the earbuds can activate the shutter for the digital camera in some embodiments.

In some embodiments various case 100 can include various features designed to prevent a user from inadvertently activating the camera 120. For example, in some embodiments shutter button 250 only operates after a two-step process where the button is first held down for an extended time period (e.g., one second) to activate a camera mode of the case. Once case 100 is in camera mode, a single click of button 250 can snap a picture from camera 120 while a double click can take a video and a second double click can stop the video. To end camera mode, shutter button 250 can be held down again for an extended period (e.g., one second). Some embodiments of case 100 can also slightly recess the second button 250 within the housing 105 to avoid inadvertent activation when, for example, a user picks up the charging case and inadvertently touches the area of button 250.

Figure 3A:
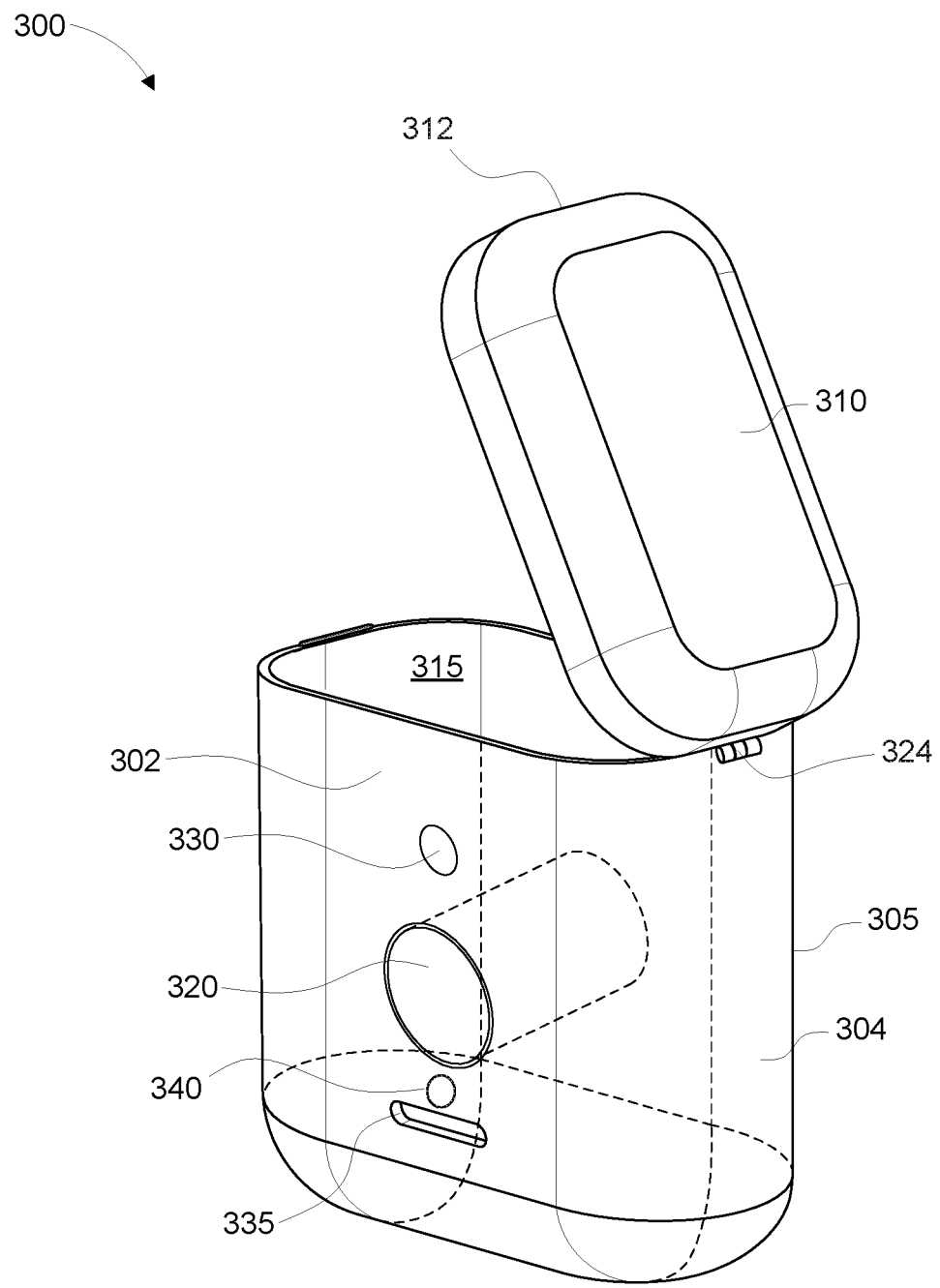
FIG. 3A illustrates a simplified front perspective view of an earbud case according to additional embodiments.

In some embodiments the multifunction accessory case 100 can be paired with another electronic device (e.g., a smartphone, a tablet, or a wearable device) that can be referred to as a host device. The digital camera 120 can be operated through an application executed on the host device. For example, the shutter can be operated through one or more controls operated through the touchscreen or pushbuttons of the host device. In some embodiments, a display of the wearable device can act as a viewfinder for the digital camera 120, shown in FIG. 1, on the multifunction accessory case 100. In some embodiments, a display on the host device can be a touchscreen display that can be used to activate one or more features of the multifunction accessory case 100 (e.g., a camera mode, feature, or shutter button FIG. 3A illustrates a simplified front perspective view of a multifunction accessory case 300 according to additional embodiments of the invention. Case 300 can be similar to case 100 and include many of the same features as case 100. For example, case 300 can include an opening 315 to receive a pair of earbuds (or to receive an insert, such as insert 700 shown in FIG. 7, the receives the pair of earbuds), a digital camera 320, a strobe 330, a speaker 335 and a microphone 340 all of which can be similar to the corresponding components described above with respect to FIGS. 1 and 2.

As shown in FIG. 3A, however, case 300 includes a lid 310 that is connected to its body 305 by a hinge 324 located on a minor side 304 of the housing 305 that extends between first and second major sides 302 and 306 (shown in FIG. 3B), respectively. Thus, lid 310 opens by rotating about the hinge 324 on the shorter side of the housing 305 as opposed to the longer side. Additionally, hinge 324 can provide sufficient friction in the movement of lid 310 such that the lid 310 can be partially opened (i.e., set between the fully open and fully closed positions) and stay in the partially opened position even when the distal end 312 of lid 310 (opposite the end at hinge 324) is placed against a surface, such as a table top, to support body 305. This allows the lid 310 can be used as a kickstand for the multifunction accessory case 300 such that case 300 can be positioned at various angles for capturing photos, videos, or video conferencing applications. Additionally, in some embodiments the camera 320 can be used in a timer mode for self-portraits and the kickstand operation provides a convenient mechanism for the case to be supported at a desired angle for the picture or portrait.

Figure 3B:
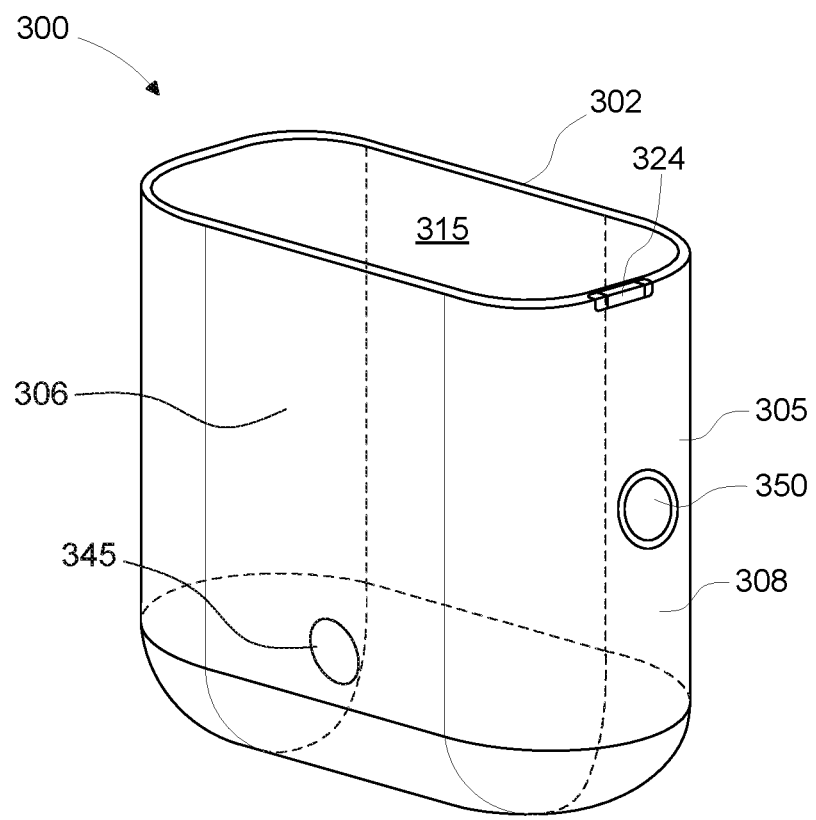
FIG. 3B illustrates a simplified rear perspective view of the earbud case shown in FIG. 3A.

In some embodiments lid 310 can be moved between the fully opened and fully closed positions into multiple discrete stops (e.g., 4, 8, 10 or more different, discrete positions or stops in various embodiments). In other embodiments, hinge 324 provides an infinite number of adjustments between the fully opened and fully closed positions similar to a hinge used in various laptop computers between the keyboard portion and the display portion FIG. 3B illustrates a simplified rear perspective view of multifunction accessory case 300 shown in FIG. 3A without lid 310 for ease of illustration. In FIG. 3B, major side 306 of the housing 305 is shown as including a first button 345 and minor side 308 is shown as including a second button 350. First and second buttons 345, 350 can be similar to or identical to buttons 245 and 250, respectively, described above with respect to FIG. 2.

Figure 4:
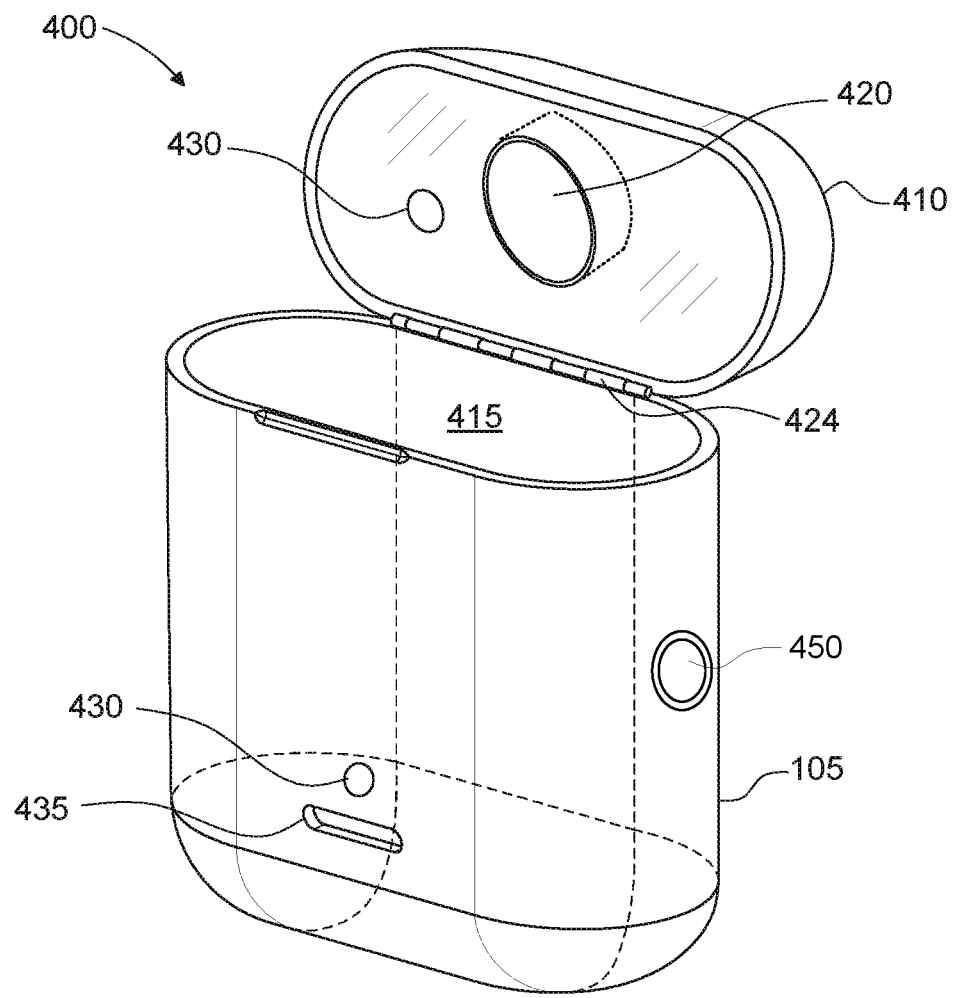
FIG. 4 illustrates a simplified front perspective view of a multifunction accessory case 400 according to some embodiments of the invention.

FIG. 4 illustrates a simplified front perspective view of a multifunction accessory case 400 according to another embodiment of the invention. Case 400 can be similar to case 100 and include many of the same features as case 100. For example, case 400 can include an opening 415 to receive a pair of earbuds (or to receive an insert, such as insert 700 shown in FIG. 7, the receives the pair of earbuds), a digital camera 420, a strobe 430, a speaker 435 and a microphone 440 all of which can be similar to the corresponding components described above with respect to FIGS. 1 and 2 except that the digital camera and strobe can be positioned in the lid 410 of case 400 instead of within its body.

Case 400 can also include one or more sensors (not shown) that detect when lid 410 is opened. In some embodiments the one or more sensors can be magnetic sensors, such as a hall effect sensor. For example, lid 410 may include a magnet that generates a magnetic field. The hall effect sensor can be placed in the body 405 of case 400 and detects whether the lid is opened or closed based on whether or not it can detect a magnetic field from the lid magnet. In various embodiments, the one or more sensors can cause case 400 to turn on camera mode (in which button 450 acts as a shutter button that can take pictures from camera 420) when the sensors detect that lid 410 has been opened. In other embodiments a two-step process can be required to initiate camera mode, such as opening the lid 410 followed by depressing button 450.

Figure 5:
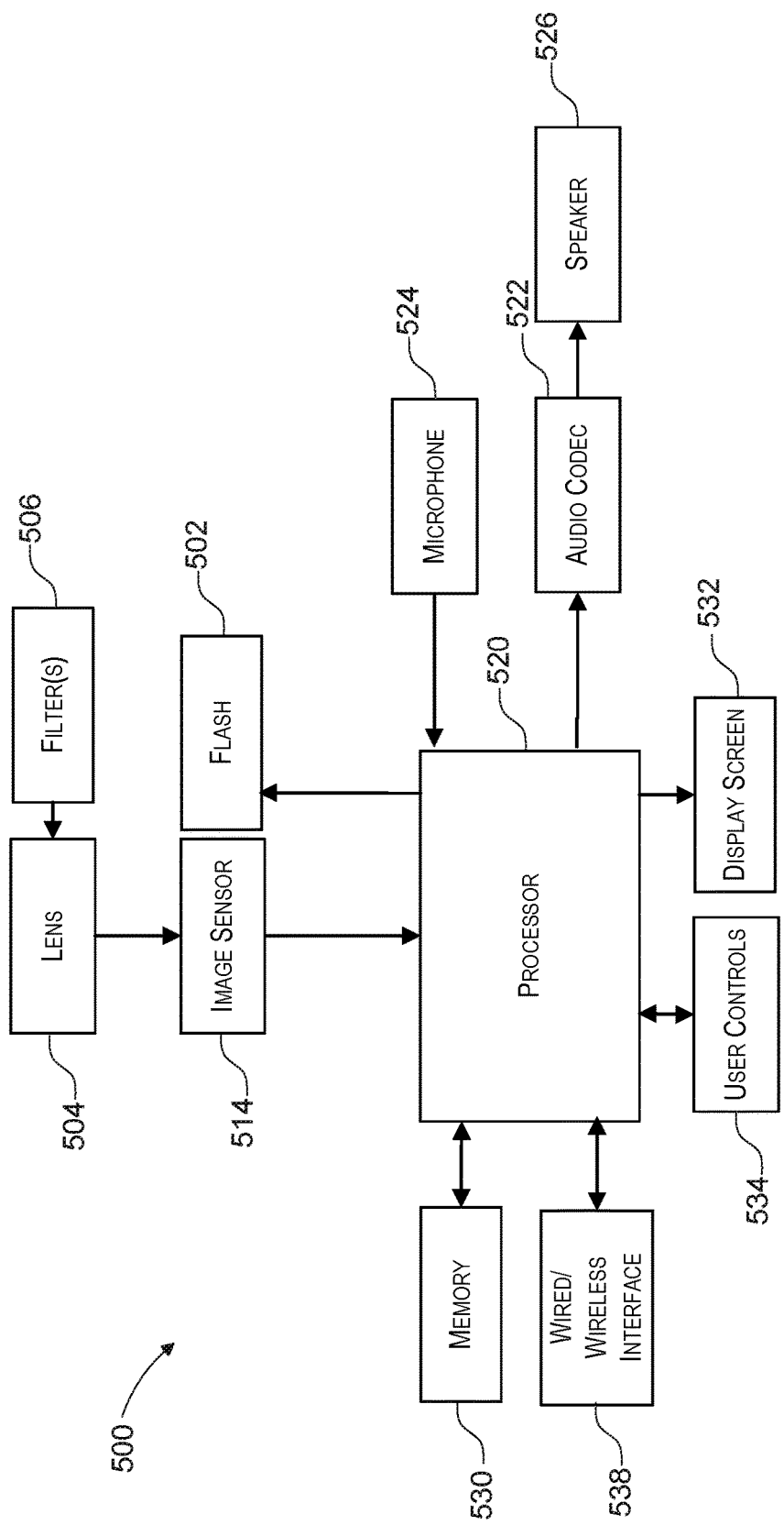
FIG. 5 depicts a block diagram of a digital photography system in accordance with the present disclosure.

FIG. 5 depicts a block diagram of a digital camera feature for a multifunction accessory case including a digital camera 500 in accordance with the present disclosure. The digital camera 500 can be a battery operated device, small enough to fit within the confines of a multifunction accessory case 100 (shown in FIG. 1) for capturing and reviewing images. The digital camera 500 produces digital assets that can be stored as digital asset files using a memory 530.

Camera 500 can include an image sensor such as a complementary metal-oxide-semiconductor (CMOS) sensor and optical components (e.g., lenses) arranged to focus an image onto the image sensor, along with control logic operable to use the imaging components to capture and store still and/or video images. Images can be stored in memory 530 and/or transmitted by the multifunction accessory case 100 to other devices for storage through the wired/wireless interface 538. In some embodiments, the images/video can be transferred from the case 100 when connected via a Depending on implementation, the optical components can provide fixed focal distance or variable focal distance; in the latter case, autofocus can be provided. In some embodiments, camera 500 can be disposed in face of a housing for a multifunction accessory case 100. Zero, one, or more cameras can be provided, depending on implementation. The digital camera 500 can be configured to be in a constant ready mode which allows for quicker capture of digital assets. However, the constant ready mode can have a drawback of higher battery demand. The digital camera 500 can alternatively be initiated by turning on the feature through a user controls 534, through a paired wearable device, or mobile device, through a voice command to a virtual assistant, or through a first button 235 or a second button 240, shown in FIG. 2, on the housing of the case 100.

In some embodiments, the digital camera 500 captures both motion video images and still images. The digital camera 500 can include a lens 504 having an adjustable aperture and adjustable shutter. In some embodiments one or more filters 506 can cover at least in part the lens 504 of the camera. The lens 504 can be a zoom lens and can be controlled by zoom and focus motor drivers. The lens 504 focuses light from a scene (not shown) onto an image sensor 514, for example, a single-chip color charged-coupled device (CCD) or CMOS image sensor. The lens 504 can be one typical for an optical system for forming an image of the scene on the image sensor 514. In other embodiments, the optical system may use a fixed focal length lens 504 with either variable or fixed focus.

The output of the image sensor 514 can be converted to digital form by Analog Signal Processor (ASP) and Analog-to-Digital (A/D) converter, and stored in memory 530. The digital asset stored in memory 530 can be subsequently manipulated by a processor 520, using embedded software programs (e.g., firmware) stored in memory 530. In such embodiments, the memory 530 can also be used to store image sensor calibration data, user setting selections, and other data which can be preserved when the camera is turned off.

It can be understood that the functions of processor 520 can be provided using a single programmable processor or by using multiple programmable processors, including one or more digital signal processor (DSP) devices. Alternatively, the processor 520 can be provided by custom circuitry (e.g., by one or more custom integrated circuits (ICs) designed specifically for use in digital cameras), or by a combination of programmable processor(s) and custom circuits. It can be understood that connectors between the processor 520 from some or all of the various components shown in FIG. 5 can be made using a common data bus. For example, in some embodiments the connection between the processor 520, the memory 530, the wired/wireless interface 538 can be made using a common data bus.

The processed images are then stored using the memory 530. It can be understood that the image memory 530 can be multiple different memory chips or elements each of which can be any form of memory known to those skilled in the art for such purposes including, but not limited to, a removable Flash memory card, internal Flash memory chips, magnetic memory, or optical memory. In some embodiments, the memory 530 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or a Memory Stick.

The image sensor 514 can have, for example, 12.4 megapixels (4088×3040 pixels) in order to provide a still image file of approximately 4000×3000 pixels. To provide a color image, the image sensor can be generally overlaid with a color filter array, which provides an image sensor having an array of pixels that include different colored pixels. The different color pixels can be arranged in many different patterns.

It can be understood that the image sensor 514 can include separately fabricated integrated circuits, or can be fabricated as a single integrated circuit as can be commonly done with CMOS image sensors. In some embodiments, this single integrated circuit can perform some of the other functions shown in FIG. 5, including some of the functions provided by processor 520.

The image sensor 514 can be effective when actuated in a first mode by timing generator 512 for providing a motion sequence of lower resolution sensor image data, which can be used when capturing video images and also when previewing a still image to be captured, in order to compose the image. This preview mode sensor image data can be provided as high-definition (HD) resolution image data, for example, with 1280×720 pixels, or as VGA resolution image data, for example, with 640×480 pixels, or using other resolutions which have fewer columns and rows of data, compared to the resolution of the image sensor. The image sensor 514 can be actuated in a second mode for providing high resolution still image data.

The zoom and focus motor drivers are commanded by control signals supplied by the processor 520, to provide the appropriate focal length setting and to focus the scene onto the image sensor 514. The exposure level of the image sensor 514 can be adjusted by controlling the f/number and exposure time of the adjustable aperture and adjustable shutter, the exposure period of the image sensor 514 via a timing generator, and the gain (i.e., International Organization for Standardization (ISO) speed) setting of an analog signal processor or analog to digital converter. The processor 520 can also control a strobe or flash 502 which can illuminate the scene. The strobe or flash 502 can include one or more light emitting diodes (LEDs).

The lens 504 of the digital camera 500 can be focused in the first mode by using "through-the-lens" autofocus. This can be accomplished by using the zoom and focus motor drivers to adjust the focus position of the lens 504 to a number of positions ranging between a near focus position to an infinity focus position, while the processor 520 determines the closest focus position which provides a peak sharpness value for a central portion of the image captured by the image sensor 514. The focus distance which corresponds to the closest focus position can then be utilized for several purposes, such as automatically setting an appropriate scene mode, and can be stored as metadata in the image file, along with other lens and camera settings.

The processor 520 can generate menus and low resolution color images that are temporarily stored in memory 530 and are displayed on a display screen 532. In some embodiments, display screen 532 is part of a paired device, such as a wearable device or mobile device. In other embodiments, display screen 532 can be incorporated on an accessory case, such as case 100 shown in FIG. 1. The display screen 532 can be a color liquid crystal display (LCD), although other types of displays, such as organic light emitting diode (OLED) displays, can be used. In preview mode, or video mode, the digital image data from memory 530 can be manipulated by processor 520 to form a series of motion preview images that are displayed, typically as color images, on the display screen 532. In review mode, the images displayed on the display screen 532 are produced using the image data from the digital image files stored in image memory 530.

The graphical user interface displayed on the display screen 532 can be controlled in response to user input provided by user controls 534, which can include controls on one or both of a wearable device, such as a smart watch, and a case for an accessory, such as multifunction case 100. The user controls 534 are used to select various camera modes, such as video capture mode, still capture mode, and review mode, and to initiate capture of still images and recording of motion images. In some embodiments, the first mode described above (i.e., still preview mode) can be initiated when the user partially depresses a shutter button, which can be one of the user controls 534, and the second mode (i.e., still image capture mode) can be initiated when the user fully depresses the shutter button. The user controls 534 are also used to turn on the digital camera 500, control the lens 504, and initiate the picture taking process. User controls 534 typically include some combination of buttons, rocker switches, joysticks, or rotary dials. In some embodiments, some of the user controls 534 are provided by using a touch screen overlay on the display screen 532. In other embodiments, additional status displays or images displays can be used. In some embodiments, the user controls can be provided through a paired device such a wearable device or mobile device.

The camera modes that can be selected using the user controls 534 include a "timer" mode. When the "timer" mode can be selected, a short delay (e.g., 10 seconds) occurs after the user fully presses the shutter button, before the processor 520 initiates the capture of a still image. In some embodiments equipped with a speaker, the timer can be audibly announced.

An audio codec 522 connected to the processor 520 receives an audio signal from a microphone 524 and provides an audio signal to a speaker 526. These components can be used to record and playback an audio track, along with a video sequence or still image.

In some embodiments, the speaker 526 can be used as part of the user interface, for example to provide various audible signals which indicate that a user control has been depressed, or that a particular mode has been selected. In some embodiments, the microphone 524, the audio codec 522, and the processor 520 can be used to provide voice recognition, so that the user can provide a user input to the processor 520 by using voice commands, rather than user controls 534. The speaker 526 can also be used to inform the user of an incoming phone call. This can be done using a standard ring tone stored in firmware memory 528, or by using a custom ring-tone downloaded from a wireless network 558 and stored in the image memory 530.

The processor 520 also provides additional processing of the image data from the image sensor 514, in order to produce rendered standard Red Green Blue (sRGB) image data which can be compressed and stored within a "finished" image file, such as a well-known exchangeable image file (Exif-JPEG) image file, in the memory 530.

The digital camera 500 can be connected via the wired or wireless interface 538 to an interface/recharger, which can be connected to a host device, which can be a desktop computer or portable computer located in a home or office. The wired/wireless interface 538 can conform to known interface specifications and utilize a variety of different protocols. For example, the wireless protocols can include Wi-Fi, Bluetooth, Bluetooth Low Energy (BLE), LTE, Zi-Wave, Zigbee, WirelessHD, WiGig, Z-Wave, and Ultra-Wide Band (UWB). Wired protocols can include, for example, for example, USB 2.0, USB 3.0, USB type C, Apple Lightning, Thunderbolt, Firewire, or other suitable wired protocols.

The digital camera 500 can include a wireless transceiver, which interfaces over a radio frequency band with the wireless network. The wireless transceiver can use various wireless interface protocols, such as the well-known Bluetooth wireless interface or the well-known 802.11 wireless interface. The host device can share images via the Internet to sharing destinations, such as an E-mail address, a picture sharing website, a social networking website, a digital picture frame, a multimedia message to a cell-phone or a printing service. Other devices (not shown) can access the images stored on the host device, or stored at one of the sharing destinations. The sharing destinations can be specified by the user using the user controls 534. Typically, the user can be allowed to designate one or more sharing destination for each digital image captured by the digital camera 500 and stored in the image memory 530.

In alternative embodiments, the wireless transceiver communicates over a radio frequency (e.g., wireless) link with a mobile phone network (not shown), such as: Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN), Long-Term Evolution (LTE), 3 AGSM, 4G, or 5G network, which connects with the Internet in order to upload digital image files from the digital camera 500. These digital image files can be provided to the host device or the sharing destinations.

Figure 6:
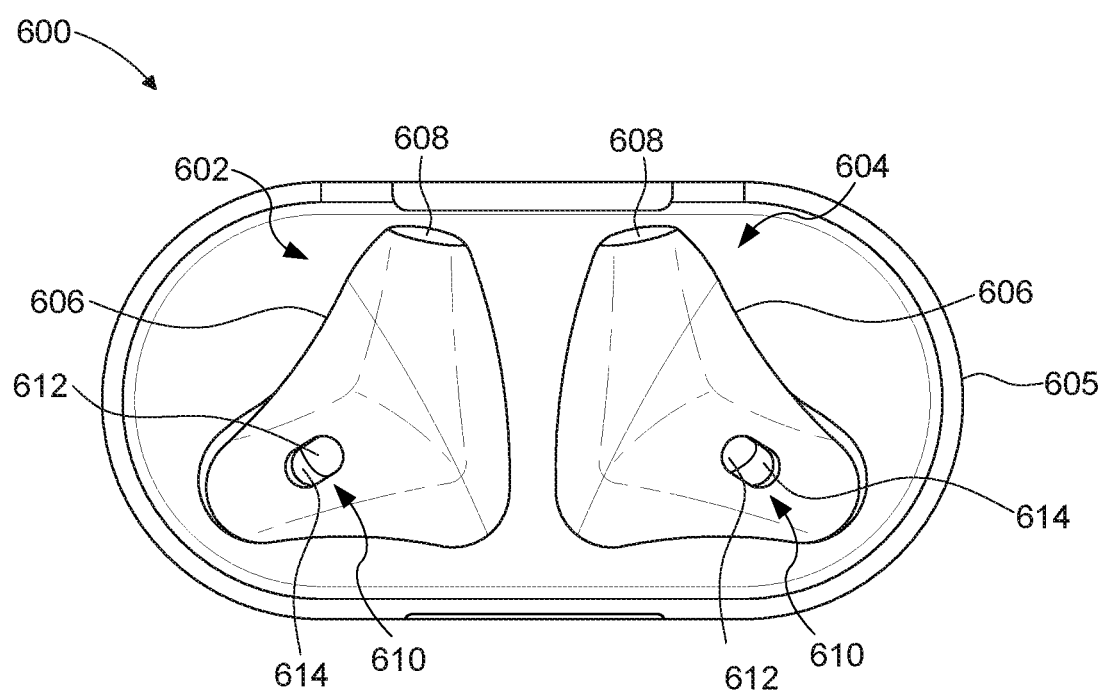
FIG. 6 shows top view of the case illustrating an exemplary orientation of the earbuds.

FIG. 6 is a top plan view of an accessory case 600 that can be representative of one of the multifunction accessory cases discussed herein, such as case 100 or case 300. FIG. 6 illustrates an exemplary orientation of a pair of earbuds 602, 604, including a non-occluding left earbud 602 and a non-occluding right earbud 604, positioned within a housing 605 of the case. Generally, non-occluding earbuds are designed not to form an airtight seal between the ear (or ear canal) and the outer surface of the earbud. By way of contrast, occluding earbuds are generally designed to fit inside of the user's ear canal and form a substantially airtight seal. Each earbud 602, 604 can include an external earbud housing 606 having an ear portion coupled to a stem portion. Earbud housing 606 can have an asymmetric shape amenable to in-the-ear retention, but does not form an airtight seal with the user's ear or ear canal. The absence of an airtight seal can benefit from volumes within the earbud being specifically tuned (e.g., by specifically shaping the volumes and/or adding material to the volumes) to achieve a desired frequency response. The ear portion of the earbuds 602, 604 can include a directional sound port 608 offset with respect to a center axis of each ear bud 602, 604. Directional sound port 608 can be designed to direct sound waves from an internal driver directly into a user's ear canal.

In addition, secondary apertures in the earbud can be employed in housing 606 to achieve desired sound performance. For example, one or more secondary apertures can serve as a controlled leak port to expose an acoustic pressure within the earbud to the external, surrounding environment. In this aspect, the secondary apertures can be calibrated to modify an acoustic response of the earbud. In this embodiment earbuds 602, 604 each include a front leak port (not shown in FIG. 6) and a multiport 610 formed in ear portion. Multiport 610 can include both a rear vent 612 and a bass port 614. In addition, earbuds according to embodiments of this disclosure can be constructed to have a seamless finish even though two or more parts are joined together to form part of the earbud.

Ear portion of earbuds 602, 604 can also include one or more "in the ear" sensors to assist each earbud 602, 604 in determining whether or not the earbud is in a user's ear. In one embodiment an optical tragus sensor can be configured to sense the presence or absence of a user's tragus, and an optical concha sensor can be configured to sense the presence or absence of a user's concha. Tragus and concha sensors, respectively, can use any type of optical sensor including, but not limited to an LED or vertical cavity surface emitting laser (VCSEL) device. Further embodiments can include one or more capacitive sensors and/or accelerometers to detect the presence of a user's ear and/or earbud orientation, as described in more detail below. In the ear detection can be useful for features such as, but not limited to, determining which earbud 602, 604 to use as a microphone when a user desires to accept an audio or video call and when a user stops using one earbud and starts using the other earbud.

In various embodiments, a distal end of stem portion of each earbud 602, 604 can include one or more electrical contacts that can be positioned and formed to make electrical contact with contacts within the charging case 600. In one particular embodiment, each earbud 602,604 can include first and second electrical contacts spaced apart from each other in an oppositional and symmetrical relationship, such as partially annular contacts. Each of the first and second contacts can include an outer perimeter that can be flush with an exterior surface of the stem portion and include an arcuate or other curved surface that creates a strong wiping action during a contact mating event. The contacts can be used to transfer power from case 600 to recharge an internal battery within each earbud 602, 604 and in some instances can also be used to transfer data to and from each earbud. In other embodiments wireless charging components can be included within each earbud enabling the earbuds to be wirelessly charged by case 600. The distal end of each earbud can also include a bottom microphone port that works in conjunction with a top microphone port to receive a user's voice and/or perform noise cancellation.

Figure 7:
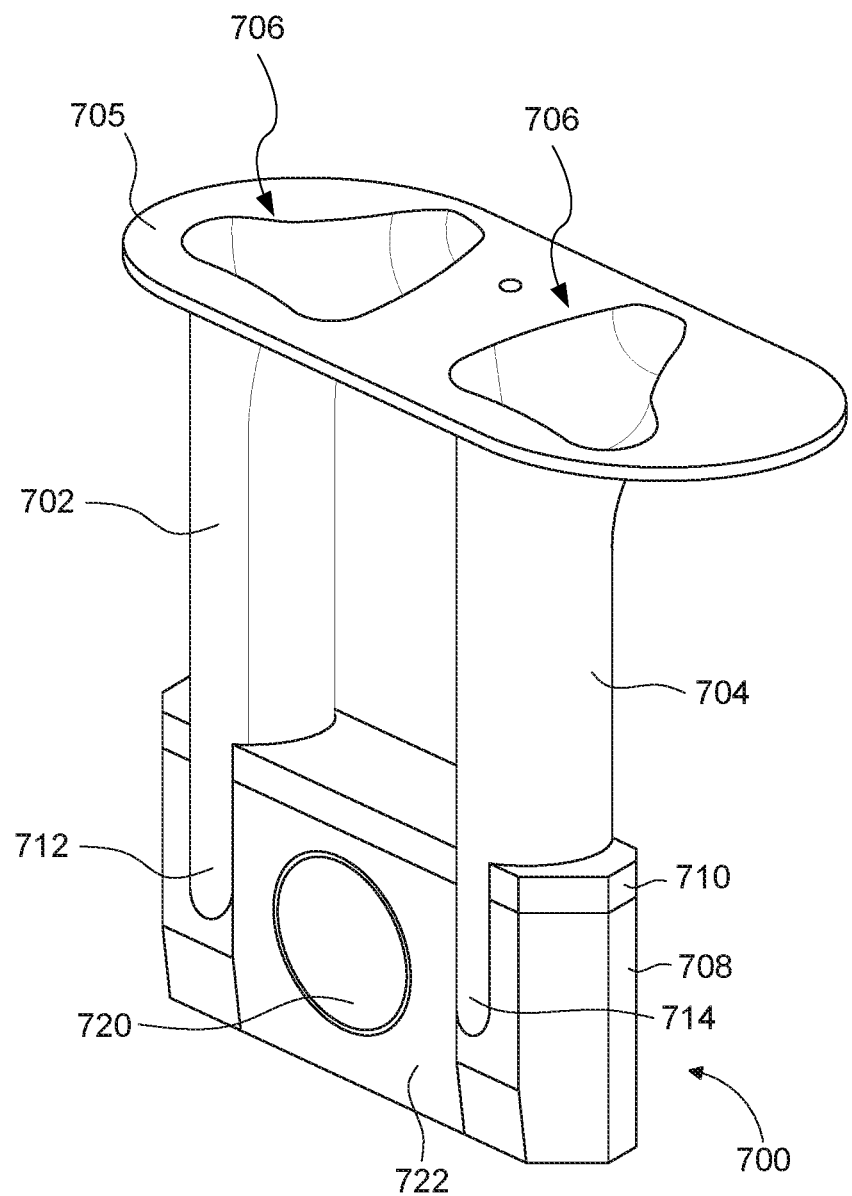
FIG. 7 is an isometric view of an insert that can be incorporated into a charging and storage case according to some embodiments of the disclosure.

FIG. 7 is an isometric view of an insert 700 according to some embodiments of the disclosure that can be included within an earbud charging and storage case according to some embodiments of the disclosure. For example, insert 700 can be inserted into case 100 through opening 115 such that a top surface 705 of the insert is flush with (or nearly flush with) the upper edge of housing 105. When included in a case, such as case 100, insert 700 can store a pair of earbuds in the orientation depicted in FIG. 6.

As shown in FIG. 7, insert 700 includes first and second shells 702, 704 that define receiving cavities for a pair of earbuds retaining and guiding a stem portion of each earbud into the multifunction accessory case 100 (see FIG. 1). The location and orientation of the first and second shells 702, 704 can provide a natural orientation for insertion of the earbuds into the ear cavity. The receiving cavity 706 in each of the shells 702. 704 can include an elongated tube portion that opens to a larger earbud receiving opening. The elongated tube portion can be sized and shaped to accommodate the stem section of an earbud and the larger earbud receiving opening can be sized and shaped to partially or fully accommodate the ear interface portion (i.e., the portion of the earbud that fits within a user's ear).

In some embodiments shells 702, 704 can be separate components joined together by the contact 708 carrier while in other embodiments shells 702, 704 can be a single component that can be formed, for example, in a molding process, a 3D printing process or with a milling process. Contact carrier 708 holds first and second earbud contacts, that can interface with a first earbud, and also holds third and fourth earbud contacts that can interface with a second earbud. A collar 710 can be bonded to a top surface of contact carrier 708. In some embodiments collar 710 can have a removable tie bar (not shown in FIG. 7) that holds the multiple pieces of the collar together during assembly and that can then be removed after assembly such that the tie bar is not included within a finished earbud case.

Distal ends 712, 714 of first and second shells 702, 704, respectively, can be narrower than the elongated tube portion of shell and each distal end 712, 714 can be fit within and bonded to collar 710 forming a completed shell and insert assembly illustrated in FIG. 7. In the completed assembly, each earbud case contact fits within a respective contact opening of shell and each earbud case contact fits within a respective contact opening of shell. Each contact opening enables its respective contact to extend into the earbud receiving cavity within its respective shell 702, 704 to make electrical contact with an earbud contact during a mating event.

In various embodiments, a digital camera and a lens 720 can be installed between the first and second shells 702, 704. A compartment 722 behind the lens 720 can contain digital processing circuitry and a memory for the digital camera. In some embodiments, the lens 720 can be removed and exchanged for one or more different lens types (e.g., zoom, wide angle). In some embodiments, the lens 720 can implement an ultra-wide angle camera lens having a 120 degree field of view.

In some embodiments insert 700 can be made primarily from a polymer or other suitable plastic material. And, in some embodiments, insert 700 can include the one or more heat spreaders or heat synchs discussed above. For example, heat spreaders can be molded into or otherwise incorporated into the bottom portion of insert 700 such that the heat spreaders are thermally coupled to the camera and its components within compartment 722 in order to transfer heat generated by the camera and its components to an exterior surface of the charging case in which insert 700 is included. Towards this end, in some embodiments, the charging case can include one or more portions of its housing that are made from a thermally conductive material in regions adjacent to compartment 722. These portions can be thermally coupled to the heat spreaders to enable heat from the camera to be better dissipated to the external environment.

In some embodiments, the insert 700 can include a camera that can be water resistant. In some embodiments, the lens 720 can implement a one or more filter 506 (e.g., a red filter) for improving underwater photography in which red light experiences higher absorption and scattering underwater. The absorption of light in water depends on the wavelength, with light in the red and violet ends of the spectrum being strongly attenuated while blue-green region of the visible spectrum has minimum attenuation. The earbud receptacle connector 700 can include an underwater pressure sensor that automatically adjusts the red gain as the water pressure increases signifying operations at increasing underwater depths.

Figure 8:
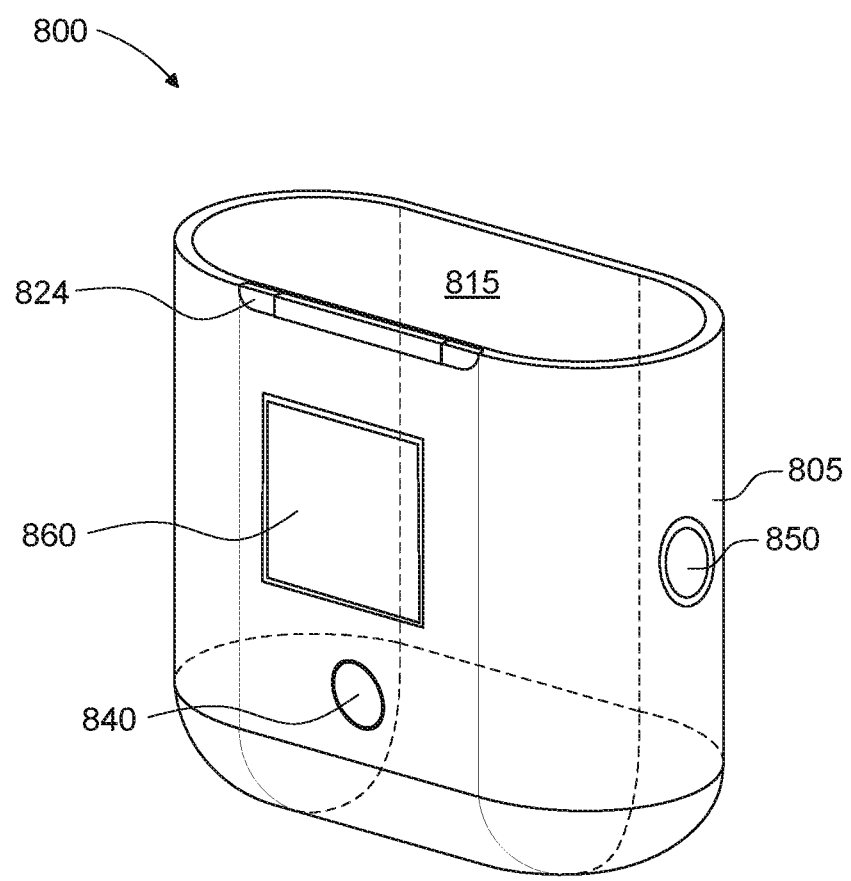
FIG. 8 illustrates a simplified perspective rear view of an earbud case according to some embodiments of the disclosure.

FIG. 8 is a simplified rear perspective view of a multi-function accessory case 800 (shown without its lid) according to some embodiments of the disclosure. Case 800 can includes many or all of the same components as described above with respect to case 100. Thus, case 800 can include an opening 815 to receive a pair of earbuds, a digital camera (not shown), a strobe (not shown), a speaker (not shown) and microphone (not shown) 330 all of which can be similar to the corresponding components described above with respect to FIGS. 1 and 2. Case 800 can also include one or more buttons, such as a first button 845 and a second button 850, that can be programmed for a number of different functions for the multifunction accessory case 800 as described above with respect to buttons 245 and 250.

Case 800 can also include a display 860 positioned at an exterior surface of the case, such as on the rear of its housing 805. Display 860 can be a liquid crystal display (LCD), organic light emitting diode (OLED), active-matrix organic light-emitting diode (AMOLED), Super AMOLED, thin film transistor (TFT), in-plane switching (IPS), or thin film transistor—liquid crystal display (TFT-LCD) that typically can be found a computing device. In some embodiments, the display 860 can be a touchscreen display. In embodiments where case 800 includes a camera, display 860 can operate as a view finder for the camera displaying to a user the area that a camera within case 800 can capture.

In embodiments with or without a camera, display 800 can display visual output via a Graphics User Interface (GUI) to the user. The visual output can include text, graphics, video, and any combination thereof. Some or all of the visual output can correspond to user-interface objects. A touch-sensitive display can also accept input from the user based on haptic and/or tactile contact. In some embodiments, a touch-sensitive display forms a touch-sensitive surface that accepts user input. The touch-sensitive display/ surface (along with any associated modules and/or sets of instructions in the computer-readable medium) detects contact (and any movement or release of the contact) on the touch-sensitive display and converts the detected contact into interaction with user-interface objects, such as one or more soft keys, that can be displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

In some embodiments, the multifunction accessory case 800 can have one or more vias or connection points on the housing 805 that can connect to a detachable display 860 allowing the display to be removably coupled to the case 800.

Figure 9:
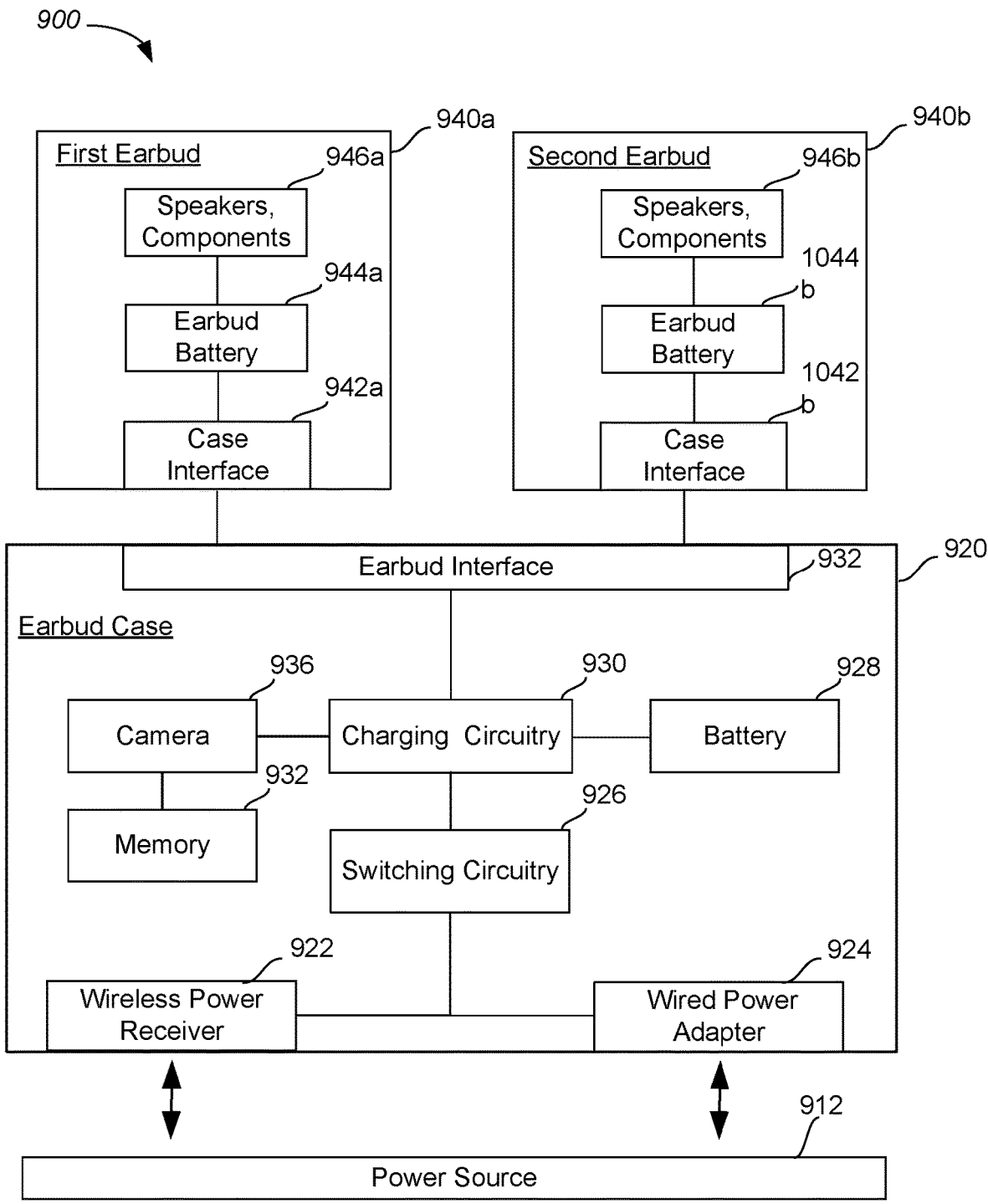
FIG. 9 is a simplified block diagram depicting various components of an earbud case according to some embodiments of the disclosure.

FIG. 9 is a simplified block diagram depicting various components of a power charging system 900 according to some embodiments of the disclosure. Charging system 900 can include a power source 912, an earbud case 920, and a pair of earbuds 940a, 940b. Earbud case 920 can be any of the earbud cases, such as earbud case 100, 300, etc., disclosed herein.

In some embodiments, a wireless charging pad (not shown) can include multiple wireless power transmitters (not shown) beneath the surface of the charging area. The multiple wireless power transmitters enable charging pad to simultaneously wireless charge more electronic devices and enable the devices being charged to be randomly placed within a charging area of the charging pad defined by the placement of the wireless power transmitters.

Earbud case 920 can include one or more wireless power receiving elements 922, a wired power adapter 924, switching circuitry 926, a battery 928, charging circuitry 930, and an earbud interface 932. Battery 928 can be a rechargeable battery that provides power for circuitry associated with earbud case 920. Wireless power receiving elements 922 can wirelessly receive power from the power source 912 within charging pad. The received power can be provided to charging circuitry 930 to charge the rechargeable battery 928. Charging circuitry can take the voltage received from receiving elements 922 and step the voltage down or up as appropriate to a voltage level that can be best suited for charging battery 928. Alternatively, a wired power adapter 924 can receive electrical power from the power source 912.

When the earbuds are properly positioned and stored within case 920, battery 928 can also be used to charge one or both of earbud rechargeable batteries 944a, 944b within the respective earbuds 940a, 940b through a connection between earbud interface 932 within the earbud case and the case interfaces 942a, 942b within each earbud. In this manner, battery 928 enables the earbuds to be charged even though case 920 is not electrically coupled to power source 910 or to another power source. Thus, case 920 can be used to charge pair of earbuds 940a, 940b while the case can be, for example, in a user's pocket as long as case battery 928 has sufficient charge.

Additionally, earbud case 920 can recharge batteries 944a, 944b within each of earbuds 940a, 940b when the earbuds are properly stored in case 920 from power stored within battery 928 even when the case is not receiving power from power source 912.

In some embodiments, the camera 936 can be powered from the battery 928. In some embodiments the memory can also be powered by the battery 928. In some embodiments, the camera 936, can also use the power from either or both earbud battery 944a and 944b for electrical power. In some embodiments, the electrical power for the camera 936 can be supplied via inductive charging or an external battery source. In some embodiments, the case 920 can be powered through an external power source connector 924

In some embodiments, the housing of charging case 920 can incorporate one or more solar cells to recharged at least in part the case battery 928. In some embodiments, the solar cells can be foldable and expanded when the case battery 928 is being recharged.

In some embodiments, the housing 905 can incorporate a kinetic recharging system. In some embodiments, the kinetic charging system can move a physical magnetic inside an electrical wiring coil, generating an electrical current for recharging the case battery 928. In some embodiments, the kinetic recharging system is powered from the natural motion of a user's body while carrying the case 920. In some embodiments, the kinetic recharging system can be activated by a user shaking the case 920.

Figure 10:
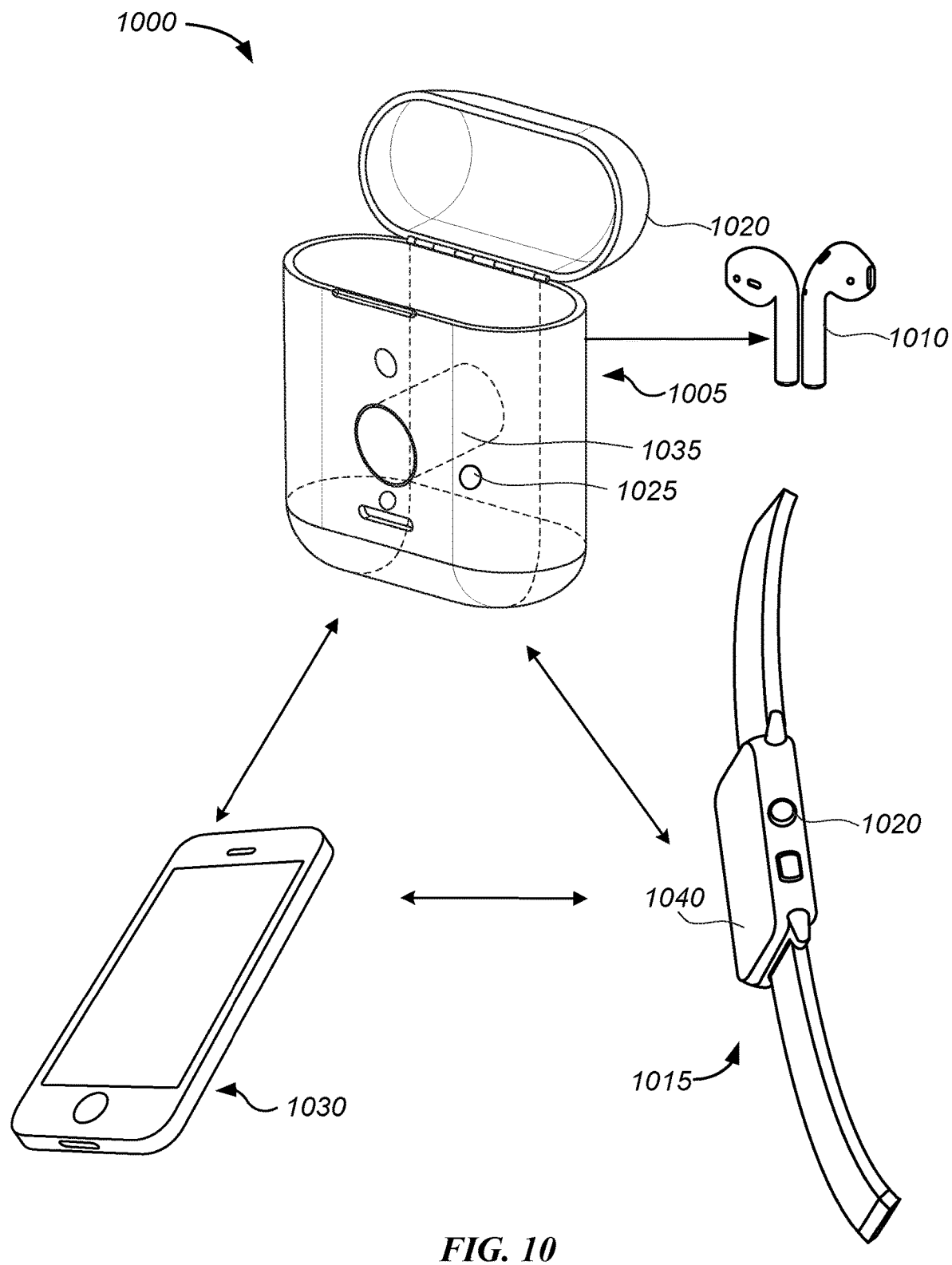
FIG. 10 is a simplified diagram of a system of electronic components according to some embodiments of the disclosure.

FIG. 10 illustrates a wireless pairing system 1000 according to some embodiments of the disclosure. System 1000 includes a multifunction accessory case 1005, a pair of wireless headphones (e.g., a pair of wireless earbuds), and one or more host devices 1030, 1040 (either of which can be, for example, a computer, a smartphone, a tablet computer, a smart watch, or the like). Multifunction accessory case 1005 can be representative of one of the accessory cases disclosed herein, such as case 100 discussed above. The multifunction accessory case 1005 can pair with a wearable device 1015. The pairing sequence can be initiated by the case 1005 by one or more user-initiated events. In a non-limiting examine opening the case lid 1020 or depressing an input button 1025 can initiate the pairing sequence. In other embodiments, the case 1005 can include a wireless radio that receives pairing instructions from a wearable device 1015. Upon receiving the pairing instruction, the case can initiate a pairing sequence to a wearable device 1015 via a wireless communication protocol (e.g., via Bluetooth®) that supports bidirectional data transfer. The wearable device 1015 can also be paired with a host device 1030 (e.g., a smartphone or tablet).

By pairing with the wearable device 1015, the multifunction accessory case 1005 can enhance the features resident on the wearable device 1015. For example, the digital camera 1035 on the multifunction accessory case 1005 can provide a larger lens than would normally be incorporated in the wearable device 1015. As a paired device, the face 1040 of the wearable device 1015 can be used as a digital viewfinder for the digital camera of the multifunction accessory case 1005. Commands entered via the touchscreen display of the wearable device 1005 (or by voice control) can be wirelessly communicated to the case 1005. As the case 1005 would not normally be strapped to a user's wrist, the camera incorporated in the case 1005 can be more adaptable for capturing digital assets.

Through the pairing process, the multifunction accessory case 1005 can utilize the communication features resident on the wearable device 1015. In various embodiments the wearable device incorporates multi-communications channels (e.g., cellular, Wi-Fi, or Bluetooth) for the sending or receiving data and application data. A paired multifunction accessory case 1005 can now utilize the communication channels of the wearable device 1005 for sending and receiving data over various paths (e.g., cellular). This can allow sensor data collected on the case 1005 to be communicated to the wearable device 1015 and transmitted to one or more network locations.

In various embodiments, accessories incorporated as part of multifunction accessory case 1005 can provide additional capabilities. For example, the camera, speaker, and microphone incorporated on the multifunction accessory case 1005 can enable a user to conduct audio or video conferencing on the case using the cellular connection of the host device 1030 or the wearable device 1015. The display screen on the case 1005 can display digital images, video, and messages, acting as a secondary display, thereby freeing up the display on the host device 1030 or wearable device 1015. The multifunction accessory case 1005 can also provide additional memory storage capabilities for the storage of music, digital assets (e.g. photos, and videos) in circumstances when the host device 1030 or wearable device 1015 has limited storage available.

Figure 11:
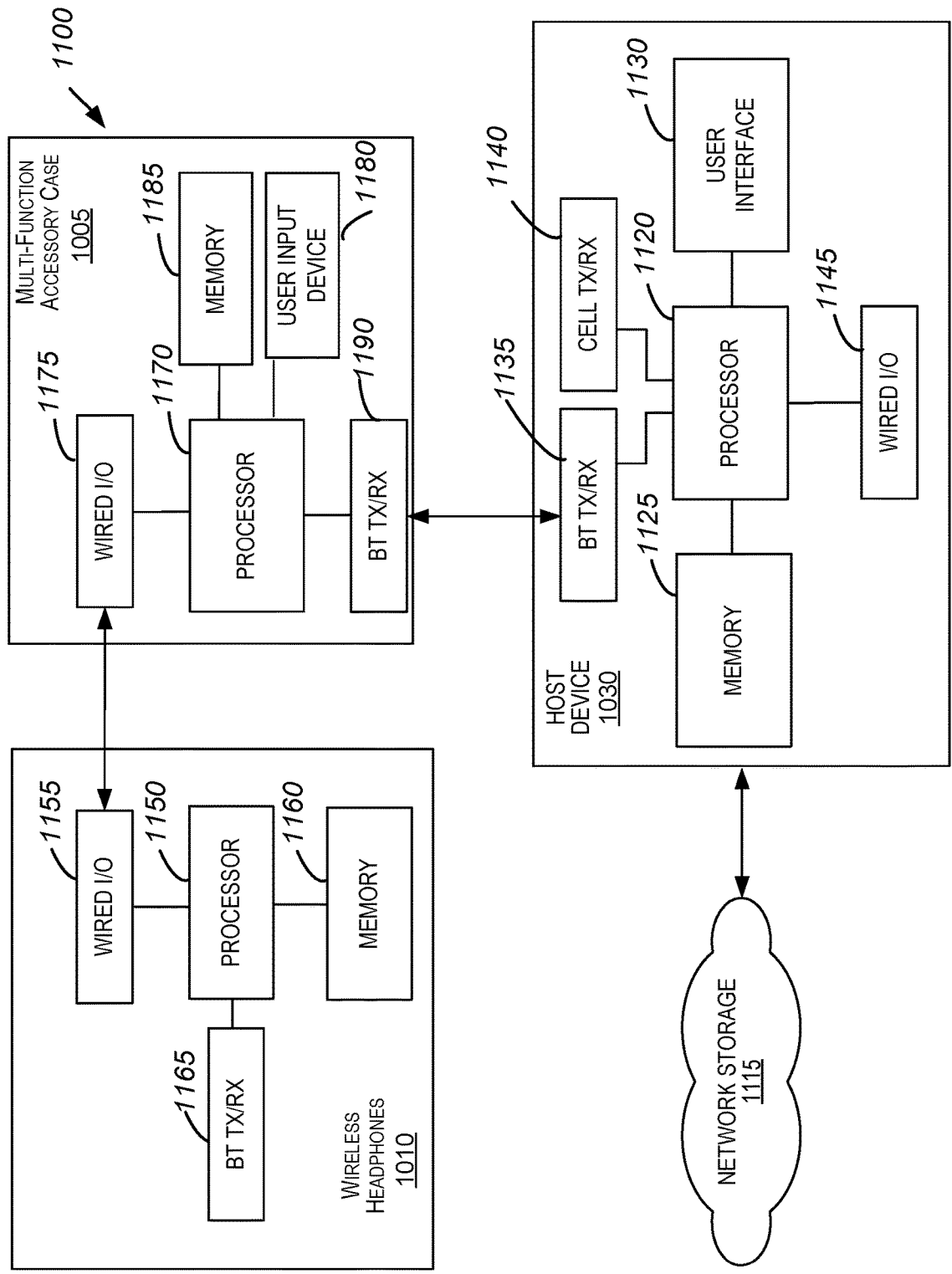
FIG. 11 is a simplified block diagram of a system for pairing electronic devices according to some embodiments of the disclosure.

FIG. 11 illustrates a wireless pairing system 1100 according to an embodiment of the present disclosure that includes a multifunction accessory case 1005, headphones 1010, and host device 1030 shown in FIG. 10. While FIG. 11 illustrates simplified block diagrams of each of a multifunction accessory case 1005, wireless headphones 1010, and host device 1030, it can be understood each of the illustrated devices can include functions and features in addition to those illustrated in FIG. 11. For example, while not shown in FIG. 11, each of multifunction accessory case 1000, wireless headphones 1010 and host device 1030 can include a battery, such as a rechargeable battery, that provides power to the various components of each device.

In some embodiments, host device 1030 can be a wearable device such as a smartwatch Host device 1030 includes a processor 1120, a memory 1125, a user interface 1130, a first wireless transceiver 1135 (e.g., a Bluetooth transceiver), a second wireless transceiver 1140 (e.g., a cellular transceiver) and a wired input/output 1145. Processor 1120, which can be implemented as one or more integrated circuits, can control the operation of host device 830. For example, in response to user input signals provided by a user through user interface 1130, processor 1120 can initiate programs to search, list or play media assets stored in memory 1125. In communication with cellular transceiver 1140, processor 1120 can control placing and receiving of telephone calls. Second transceiver 1140 can also be used to communicate data with a network, including network storage 1115. First wireless transceiver 1135 can be used to support short range wireless communication (e.g., Bluetooth communication) between host device 1030 and various accessory devices, including a multifunction accessory case 1005. Memory 1125 can store any information, including Bluetooth pairing information as described in more detail below. Wired input/output 1145 can be any wired connection, such as a USB protocol or a proprietary protocol, such as that used by the Apple Lightning™ connector.

As the wearable device has many comparable communication features of a smartphone to include but not limited to cellular voice and data, Bluetooth, and Wi-Fi, a user can use the a wearable device in combination with a multifunction accessory case 1005 in lieu of carrying the smartphone. In some embodiments, the multifunction accessory case 1005 can pair with the host device 1030. The multifunction accessory case 1005 can includes a processor 1170, a wired input/output 1175, and a user input device 1180, a memory 1185, and a wireless transceiver 1190.

Processor 1170, which can be implemented as one or more integrated circuits, can control the operation of multifunction accessory case 1005 by executing computer instructions stored in a computer-readable memory or medium, such as memory 1185. For example, instructions stored within memory 1185 can cause processor 1170 to, in response to user input signals provided by user input device 1180, send an instruction to headphones 1010 (e.g., via wired input/output interface 1175 or by a wireless channel between multifunction accessory case 1005 and wireless headphones 810) to enter a pairing sequence with a host device. Wired input/output 1175 can be any wired connection between multifunction accessory case 1005 and wireless headphones 810 including a proprietary interconnection. In one example wired input/output 1175 can be a portion of an electrical between pair of earbuds and case. Wired input/output 1175 can be used for charging and/or data. In various embodiments wired input/output 1175 can be used to transmit a signal to headphones 810 to initiate a pairing sequence, as described in more detail below. The processor 1170 can be used to control a digital camera, a strobe, a microphone, and a speaker that can be incorporated in the multifunction accessory case 800.

User input device 1180 can be any device operable by a user. In one embodiment user input device 1180 can be a lid sensor such as lid sensor that detects an opening or a closing of a lid of multifunction accessory case 1005. In one example an opening event can be detected and processor 1170 sends a signal through wired input/output 1175 of multifunction accessory case to wired input/output 1155 of headphones to processor 1150 of headphones 1010 to initiate a pairing sequence and/or to turn on Bluetooth transceiver 1165. In another example, wireless headphones 1010 have never been paired before and headphones 1010 enter a pairing sequence. In a further example headphones 1010 have been paired before and headphones 1010 activate Bluetooth transceiver 1165 but do not initiate a pairing sequence. In another example, the multifunction accessory device 1005 can enter a pairing sequence with the host device 1030. In one embodiment multifunction accessory case 1005 may include one or more indicator lights to notify a user that it has sent a pairing signal to either the host device 1030 or the headphones 1010. In one embodiment, the multifunction accessory case 1005 may also be equipped with a wireless transceiver 1190 (e.g., a Bluetooth transceiver) that can wirelessly communicate with wireless transceiver 1135 of the host device 1030 of the wireless transceiver 1165 of the wireless headphones 810.

Wireless headphones 1010 can be traditional headphones that are worn over a user's head, headsets (a combination of a headphone and a microphone), earbuds (very small headphones that are designed to be fitted directly in a user's ear) or any other portable listening device. In some embodiments wireless headphones 1010 include a processor 1150, a wired input/output 1155, a memory 1160 and a wireless transceiver 1165 (e.g., a Bluetooth transceiver).

Processor 1150, which can be implemented as one or more integrated circuits, can control the operation of headphones 1010. Wired input/output 1155 can be any wired connection between multifunction accessory case 1005 and wireless headphones 1010 including a proprietary interconnection. In one example wired input/output 1155 can be an electrical connector that provides a direct electrical connection between wireless headphones 1010 and multifunction accessory case 1005 when the headphones are mated with the multifunction accessory case 1005 (e.g., stored in a case). Wired input/output 1155 can be used for charging wireless headphones 1010 and/or communicating data with multifunction accessory case 1005. In one example, wired input/output 1155 of headphones 1010 can be used to receive a signal from wired input/output 1175 of multifunction accessory case 1005 to initiate a pairing sequence of the headphones, as described in more detail below.

Wireless transceiver 1165 can be used to support short range wireless communication (e.g., Bluetooth communication) between headphones 1010 and various host devices, including host device 1030. In one embodiment, multifunction accessory case 1005 may also be equipped with a wireless transceiver (not shown; e.g., a Bluetooth transceiver) that can wirelessly communicate with wireless transceiver 1165. Wireless transceiver 1165 enables headphones 1010 to communicate wirelessly with host device 1030 once a channel for wireless communication has been established between the two. For example, headphones 1010 and host device 1030 may each be provided with Bluetooth® technology, including appropriate short-range transceiver units. In some embodiments, it may be possible to establish a Bluetooth® pairing between host device 1030 and headphones 1010 using conventional techniques, such as manual entry of a passcode (or PIN code) associated with headphones 1010 into host device 1030. In other embodiments, Bluetooth® pairings can be established automatically as described below.

Memory 1160 can store firmware for operating headphones 1010 as well as data for coupling with other wireless ear buds and for pairing headphones 1010 with companion host devices. For example, memory 1160 can store a connection history for companion host devices such as host device 1030, with which headphones 1010 have previously paired. The connection history can include data for automatically pairing headphones 1010 with the companion host device without having to configure a connection between the headphones and the companion host device (e.g., enter a password, exchange shared secrets, etc.). For example, the connection history can include one or more link keys for connecting to a wireless network (e.g., Bluetooth link keys). Memory 1160 can also store a MAC address that uniquely identifies headphones 1010 as well as store a paired partner MAC address of another headphone that has previously coupled with the wireless ear bud. For example, in one embodiment headphones 1010 are wireless earbuds and memory 1160 can store the MAC address of a paired partner earbud.

In another example once headphones 1010 are paired with host device 1030 or wearable device 1015, the host device can save related pairing information from headphones 1010 to a network storage system 1115 such as cloud storage. In one embodiment the related pairing information stored in network storage 1115 can then be used by other host devices to be pre-paired with wireless headphones 1010. As an illustrative example, in one embodiment wireless headphones 1010 can be initially paired with smartphone (e.g., an iPhone). A smartphone device can communicate the pairing information to the user's iTunes or iCloud account that can be saved on a remote network separate from host device 1030 (e.g., in the iCloud). The wireless headphones 1010 can then be listed on the user's iTunes or iCloud account as an authorized wireless device for the account. For example, the user's iCloud account may include a first list of host devices (one or more smart phones, one or more tablet computers and one or more laptop computers) including host device 1030 that are automatically authorized, for example based on the previous authorization and/or authentication of the devices to the iCloud account, to be paired with one or more wireless headphones that have been added to the account (including wireless headphones 1010). The user can then go to their tablet computer which can be automatically paired to the wireless headphones 1010 or multifunction accessory case 1005 without having to initiate a separate pairing sequence between headphones 1010 and the tablet computer based on the list of approved pairing in the user's iCloud account. Multiple host devices can be pre-authorized and automatically paired using this feature.

Figure 12:
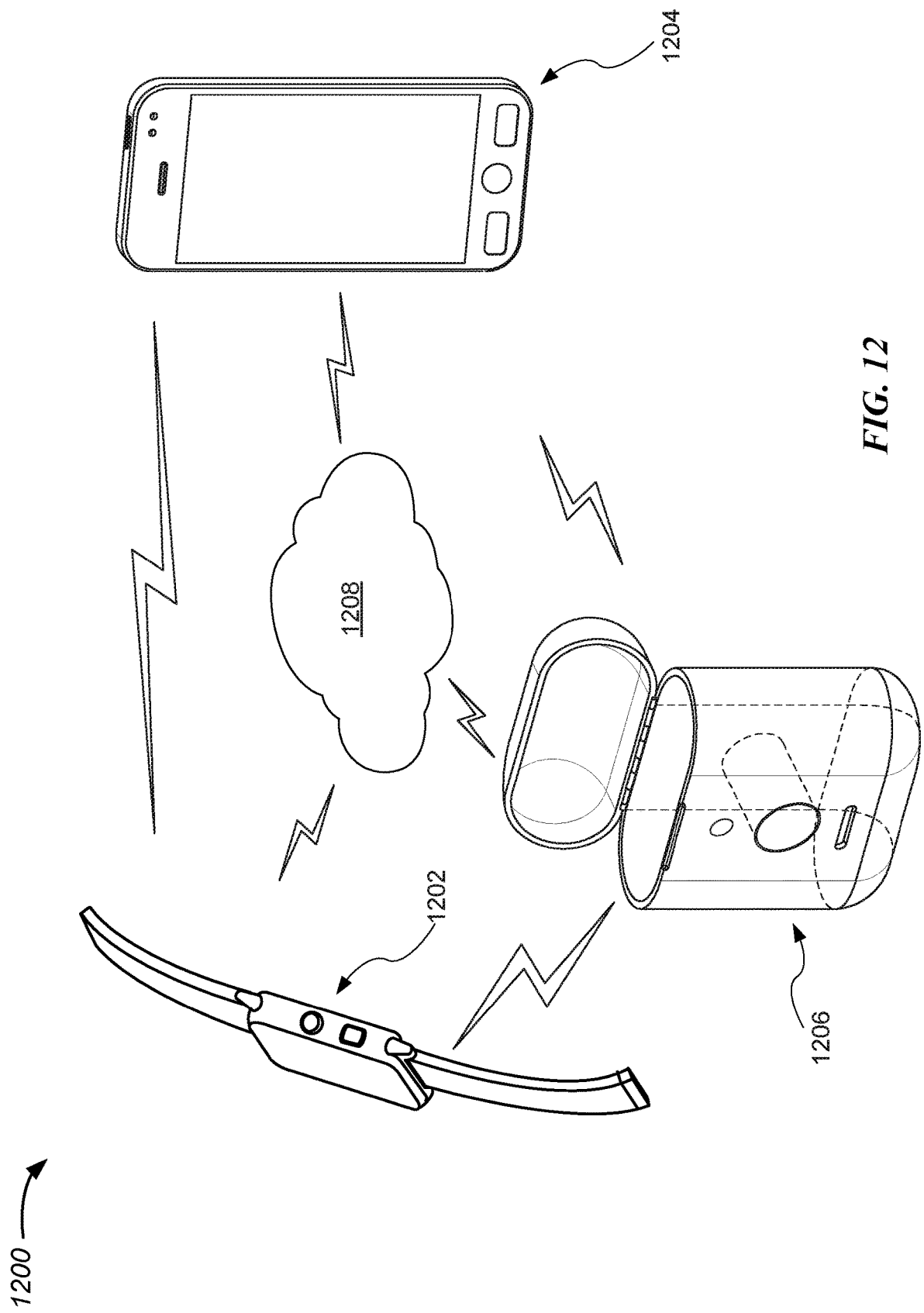
FIG. 12 depicts an illustration of the exemplary communication path for the system according to some embodiments of the disclosure.

FIG. 12 depicts an illustration of the multiple exemplary communication paths for the system 1200 according to some embodiments of the disclosure. In some embodiments, a wearable device 1202 such as an electronic watch can synchronize the digital assets stored on or accessible by the wearable device 1202 with a mobile device 1204 such as a mobile phone or smartphone. In some embodiments, the wearable device 1202 can synchronize the digital assets with digital assets stored in a memory of the multifunction accessory case 1206. In some embodiments, the wearable device 1202 can synchronize the digital assets with a cloud storage system 1208.

In various embodiments, content stored on one device (e.g., a wearable device 1202) can be synchronized with a mobile device 1204 or multifunction accessory case 1206. The mobile device 1204 or multifunction accessory case 1206 companion can have more processing power, more memory, more battery, or the like than the wearable device 1202. The mobile device 1204 or multifunction accessory case 1206 can act as a proxy device to send and receive signals on behalf of other proxied devices.

Content synchronization may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

A multifunction accessory case 1206 can determine whether an image collection has changed. An image collection may change due to a variety of reasons. For example, the multifunction accessory case 1206 can include a camera and any photos taken with the camera are stored in an image collection available on the multifunction accessory case 1206, the wearable device 1202, or the mobile device 1204. In another example, a service (e.g., content infrastructure) to which the multifunction accessory case 1206 connects can provide instruction and/or content that modify the collection of images stored on the multifunction accessory case 1206. In yet another embodiment, the multifunction accessory case 1206 can connect with a service such as a cloud storage 1208 that hosts an image collection.

In the course of this procedure according to one embodiment, the multifunction accessory case 1206 can maintain a set of identifiers that includes an identifier for all or part of the images in the image collection accessible to the multifunction accessory case 1206. An image identifier may uniquely identify the image relative to the collection of images or to all images accessible to the multifunction accessory case 1206. The multifunction accessory case 1206 can compare the set of identifiers that it maintains with a set of identifiers for the current collection of images. Any difference in missing identifiers or added identifiers may be used to determine that the image collection has changed.

The multifunction accessory case 1206 can generate a notification of the change and sends the notification to the mobile device 1204. The notification can include any type or format of message that indicates that a change has occurred. In some embodiments, when the multifunction accessory case 1206 can be paired with a wearable device 1202 or a mobile device (e.g., mobile device 1204) that utilizes more energy efficient communication protocols, the multifunction accessory case 1206 can send a notification that at a minimum can be indicative of a dirty bit. The dirty bit can be recognized by the wearable device 1202 or the mobile device 1204 as indicating that new or updated content can be available at or through the multifunction accessory case 1206.

The wearable device 1202 or the mobile device 1204 can generate a signature of an image collection stored on the wearable device 1202 or the mobile device 1204 and sends the signature to the multifunction accessory case 1206. A signature of an image collection may include hash or other check performed on one device that if performed by another device on the same data set results in the other device computing the same value, hash, check.

The multifunction accessory case 1206 receives the signature from either the wearable device 1202 or the mobile device 1204 and generates a signature of the image collection available to it. If the signature generated by the wearable device 1202 or the mobile device 1204 can be the same as the signature generated by the multifunction accessory case 1206, then no synchronization is needed between the devices. If the signature generated by the wearable device 1202 or the mobile device 1204 is different from the signature generated by the multifunction accessory case 1206, the multifunction accessory case 1206 sends a set of identifiers that includes an identifier for all or part of the images in its image collection that can be made available on the wearable device 1202 or the mobile device 1204.

The wearable device 1202 and/or the mobile device 1204 receives the set of identifiers and determines an action set based on the set of identifiers. In one embodiment, the wearable device 1202 or the mobile device 1204 determines an add action for each identifier in the set of identifiers that is not present in a set of identifiers maintained by the wearable device 1202 or the mobile device 1204 that includes an identifier for all or part of an image collection on the wearable device 1202 or the mobile device 1204. The add action instructs the wearable device 1202 or the mobile device 1204 to retrieve the image associated with the new identifier from the multifunction accessory case 1206. In another embodiment, the mobile device determines a delete action for each identifier in the set of identifiers maintained by the wearable device 1202 or the mobile device 1204 that is not present in the set of identifiers received from the multifunction accessory case 1206. The delete action instructs the wearable device 1202 or the mobile device 1204 to remove the image associated with the missing identifier from the set of identifiers received from the multifunction accessory case 1206.

In various embodiments, the wearable device 1202 or the mobile device 1204 determines an update action for one or more images in the image collection on the wearable device 1202 or the mobile device 1204. The update action may be similar to an add action in that it instructs the wearable device or the mobile device 1204 to retrieve the image associated with the identifier from the multifunction accessory case 1206 even if the image already exists on the wearable device 1202 or the mobile device 1204. The update action can further instruct the wearable device 1202 or the mobile device 1204 to retrieve update information from the multifunction accessory case 1206 for an image on the wearable device 1202 or the mobile device 1204. The update information can include new data for a portion of the image, one or more edits or operations to be applied to the image to transform the image, or the like.

In various embodiments, the multifunction accessory case 1206 may send version information together with the set of identifiers. The wearable device 1202 and/or the mobile device 1204 can compare the version information received from the multifunction accessory case 1206 with its own version information. If a difference arises between the versions on an image, the wearable device 1202 and/or mobile device 1204 can determine to perform an add action or an update action.

The wearable device 1202 and/or mobile device 1204 can perform the action set. For an add action, the wearable device 1202 and/or mobile device 1204 may add a new identifier associated with an image accessible to the multifunction accessory case to a retrieval or download list. The wearable device 1202 and/or mobile device 1204 can retrieve or download the new image when the wearable device 1202 and/or mobile device 1204 is ready, for example, when battery conditions permit or when stable communications are available. For a delete action, the wearable device 1202 and/or mobile device 1204 may remove an image from its storage. The wearable device 1202 and/or mobile device 1204 may delete the image from its local storage or delete the identifier from the set allowing the image to be overwritten with a new image.

For an update action, the wearable device 1202 and/or mobile device 1204 may add a new identifier associated with an image accessible to the multifunction accessory case 1206 to the retrieval or download list if there are differences in version information. If the wearable device 1202 and/or mobile device 1204 knows that one or more edits or operations are to be applied to an existing image, the wearable device 1202 and/or mobile device 1204 can retrieve the edits or operations from the multifunction accessory case 1206.

In some embodiments, each of the wearable device 1202, the mobile device 1204, and the multifunction accessory case 1206 may use the techniques described above to synchronize between a cloud storage 1208 and each of the devices.

In some embodiments, a connector interface and/or radio frequency interface can be used to support synchronization operations in which data can be transferred from a multifunction accessory case to a multifunction accessory case, a mobile device, or a cloud storage (or vice versa). For example, as described below, a user can customize certain information for multifunction accessory case 1206 (e.g., a "favorite" contacts list and/or specific predefined text messages that can be sent). While user interface can support data-entry operations, a user may find it more convenient to define customized information on a separate device (e.g., a tablet or smartphone) that has a larger interface (e.g., including a real or virtual alphanumeric keyboard), then transfer the customized information to the multifunction accessory case via a synchronization operation. Synchronization operations can also be used to load and/or update other types of data in storage subsystem, such as media items, application programs, and/or operating system programs. Synchronization operations can be performed in response to an explicit user request and/or automatically, e.g., when the multifunction accessory case 1206 resumes communication with a particular host device or in response to either device receiving an update to its copy of synchronized information. The synchronization can occur over a wireless signal such as Wi-Fi, Bluetooth or cellular signal.

The communication of data from a device (e.g., wearable device 1202, the mobile device 1204 or multifunction accessory case 1206) can occur through various protocols (e.g., 802.11 protocols, Bluetooth protocols, and near field communication (NFC) protocols). To determine which protocol to use, a device can include a link manager for determining which protocol to use for a particular application, and thus which driver path data can be sent. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR can be also referred to as Classic Bluetooth.

Representative applications of apparatuses and methods according to the presently described embodiments are provided in this section. These examples are being provided solely to add context and aid in the understanding of the described embodiments. It can thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples are not as limiting. For example, in some embodiments, the case can store more than two earbuds. In some embodiments, the housing may appear different as additional features are added.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what can be intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

As described above, one aspect of the present technology is the gathering and use of data available from various sources such as the collection of health data from various sensors. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to calculate progress towards health or fitness objectives. Accordingly, use of such personal information data can be presented to a user on the display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting sensor data, the present technology can be configured to allow users to select to "opt in" or "opt out" of participation in the collection of personal information data during registration for services or anytime thereafter. In another example, users can select not to provide personal information to be displayed in non-rectangular areas. In yet another example, users can select to limit amount of personal data is maintained or entirely prohibit the display of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the bounding path techniques, or publicly available information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing disclosure has been described in detail by way of illustration and example for purposes of clarity and understanding, it can be recognized that the above described devices may be embodied in numerous other specific variations and embodiments without departing from the spirit or essential characteristics of the devices. Certain changes and modifications may be practiced, and it is understood that the disclosure is not to be limited by the foregoing details, but rather is to be defined by the scope of the appended claims.

Additionally, spatially relative terms, such as "bottom" or "top" and the like can be used to describe an element and/or feature's relationship to another element(s) and/or feature(s) as, for example, illustrated in the figures. It can be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. A case for a pair of earbuds, the case comprising:
    a housing having first and second opposing major surfaces and one or more cavities disposed between the first and second opposing major surfaces are configured to receive one or more earbuds;
    a lid attached to the housing by a hinge and operable to be moved between an open and a closed position, wherein when the lid is in the closed position the lid and housing cooperate to form a rectangular prism having rounded edges and rounded corners with the first and second opposing major surfaces forming exterior surfaces of the rectangular prism;
    an input device including circuitry configured to detect a user interaction with the case and to generate a signal in response to the detected user interaction;
    a processor coupled to the input device, the processor configured to send an instruction to the pair of earbuds to initiate wireless pairing of the pair of earbuds to a host electronic device in response to the generated signal;
    a charging system including
        a case battery; and
        charging circuitry configured to initiate charging of an earbud when an earbud of the one or more earbuds is placed into a cavity of the one or more cavities;
    a digital camera including a lens forming an exterior surface of the case, digital processing circuitry, and a memory, wherein the digital camera is powered by the case battery;
    a shutter operatively coupled to the digital processing circuitry within the case to activate the digital camera to capture at least one image; and
    data communications circuitry configured to transmit digital images from the memory to a second electronic device.

2. The case of claim 1 further comprising a speaker disposed within the housing and operatively coupled to emit sound through a speaker port formed in the housing.

3. The case of claim 1 further comprising a microphone disposed within the housing and operatively coupled to receive sound through a microphone port formed in the housing.

4. The case of claim 1 further comprising a strobe coupled to the housing.

5. The case of claim 4 wherein the strobe can indicate a current charge level of the case battery.

6. The case of claim 1 further comprising a shutter button positioned at an exterior surface of the housing.

7. The case of claim 1 further comprising a display disposed at an exterior surface of the housing.

8. The case of claim 7 wherein the display is configured to act as a viewfinder for the digital camera.

9. The case of claim 7 wherein the display is configured to display images captured by the digital camera.

10. The case of claim 1 further comprising a wireless power receiving element configured to wirelessly receive power from a wireless charger to charge the case battery.

11. The case of claim 1, wherein the shutter comprises a button positioned on an exterior surface of the housing.

12. The case of claim 1, wherein the shutter comprises a voice-recognition processing circuit.

13. A case for a pair of earbuds, the case comprising:
a housing having first and second opposing major surfaces and one or more cavities disposed between the first and second opposing major surfaces are configured to receive one or more earbuds;
a lid attached to the housing by a hinge and operable to be moved between an open and a closed position, wherein when the lid is in the closed position the lid and housing cooperate to form a rectangular prism having rounded edges and rounded corners with the first and second opposing major surfaces forming exterior surfaces of the rectangular prism;
a case battery;
an input device including circuitry configured to detect a user interaction with the case and to generate a signal in response to the detected user interaction;
a processor coupled to the input device, the processor configured to send an instruction to the pair of earbuds to initiate wireless pairing of the pair of earbuds to a host electronic device in response to the generated signal;
a digital camera including a lens forming an exterior surface of the case, digital processing circuitry, and a memory, wherein the digital camera is powered by the case battery;
a shutter operatively coupled to the digital processing circuitry within the case to activate the digital camera to capture at least one image;
a display mounted on the housing; and
data communications circuitry configured to transmit digital images from the memory to a second electronic device.

14. The case of claim 13 further comprising a speaker disposed within the housing and operatively coupled to emit sound through a speaker port formed in the housing.

15. The case of claim 14 wherein the speaker emits a sound when the shutter is activated.

16. The case of claim 14 further comprising a shutter button positioned at an exterior surface of the housing.

17. The case of claim 13 wherein the display is configured to act as a viewfinder for the digital camera.

18. A case for a pair of earbuds, the case comprising:
a housing having first and second opposing major surfaces and one or more cavities configured to receive one or more earbuds;
a case battery;
a lid attached to the housing by a hinge and operable to be moved between an open and a closed position, wherein when the lid is in the closed position the lid and housing cooperate to form a rectangular prism having rounded edges and rounded corners with the first and second opposing major surfaces forming exterior surfaces of the rectangular prism;
an input device including circuitry configured to detect a user interaction with the case and to generate a signal in response to the detected user interaction;
a processor coupled to the input device, the processor configured to send an instruction to the pair of earbuds to initiate wireless pairing of the pair of earbuds to a host electronic device in response to the generated signal;
a digital camera coupled to receive power from the case battery, the digital camera including a lens forming an exterior surface of the case, digital processing circuitry, and a memory for storing digital images generated by the digital camera;
a shutter operatively coupled to the digital processing circuitry within the case to activate the digital camera to capture at least one image; and
data communications circuitry configured to transmit the digital images from the memory to a second device, wherein the second device provides a viewfinder for the digital camera.

19. The case of claim 18 wherein the data communications circuitry is configured to receive a shutter command signal from the second device, the shutter command signal causing the digital processing circuitry of the digital camera to capture an image.

20. The case of claim 18 further comprising a microphone disposed within the housing and operatively coupled to receive sound through a microphone port formed in the housing.

21. The case of claim 20 wherein the microphone can receive an audible command, the data communications circuitry converting the audible command into a shutter command signal causing the digital processing circuitry of the digital camera to capture an image.

22. The case of claim 18 further comprising a speaker mounted on the housing, wherein the speaker emits an audible countdown until one of the digital images is captured.

* * * * *